(12) United States Patent
Pietromonaco

(10) Patent No.: US 9,866,159 B1
(45) Date of Patent: Jan. 9, 2018

(54) ROTOR CONTROL METHOD AND DEVICE

(71) Applicant: ARM Ltd., Cambridge (GB)

(72) Inventor: David Victor Pietromonaco, Cupertino, CA (US)

(73) Assignee: ARM Ltd., Cambridge (GB)

( * ) Notice: Subject to any disclaimer, the term of this patent is extended or adjusted under 35 U.S.C. 154(b) by 0 days.

(21) Appl. No.: 15/368,319

(22) Filed: Dec. 2, 2016

(51) Int. Cl.
    *H02P 25/08* (2016.01)
    *H02P 6/185* (2016.01)
    *H02P 25/089* (2016.01)

(52) U.S. Cl.
    CPC ............ *H02P 6/185* (2013.01); *H02P 25/089* (2016.02)

(58) Field of Classification Search
    CPC ........ H02P 6/185; H02P 25/089; H02P 27/08; H02P 25/03; H02P 6/14
    USPC ...................... 318/254.1, 599, 245, 503, 538
    See application file for complete search history.

(56) References Cited

U.S. PATENT DOCUMENTS

| | | | | |
|---|---|---|---|---|
| 2,477,993 | A | * | 8/1949 | Lewis ................... G06M 1/107 246/125 |
| 8,450,954 | B2 | * | 5/2013 | Pietromonaco ......... H02P 25/14 318/245 |
| 9,130,433 | B2 | | 9/2015 | Pietromonaco |
| 9,214,837 | B2 | | 12/2015 | Pietromonaco |
| 2008/0298784 | A1 | * | 12/2008 | Kastner ..................... G01P 3/44 388/811 |
| 2013/0334937 | A1 | * | 12/2013 | Yamada ................. H02K 19/10 310/68 D |
| 2015/0130390 | A1 | * | 5/2015 | Pietromonaco ........ H02K 16/02 318/716 |
| 2015/0326100 | A1 | | 11/2015 | Pietromonaco |
| 2016/0065041 | A1 | | 3/2016 | Pietromonaco |
| 2016/0079889 | A1 | | 3/2016 | Pietromonaco |
| 2016/0079893 | A1 | | 3/2016 | Pietromonaco |

* cited by examiner

*Primary Examiner* — Bentsu Ro
*Assistant Examiner* — Thai Dinh
(74) *Attorney, Agent, or Firm* — Berkeley Law & Technology Group, LLP

(57) ABSTRACT

Electric motors may include one or more sensors usable to determine rotor alignment and/or speed. A method and apparatus for rotor alignment and/or speed error detection and/or correction are proposed, such as using signals from one or more sensors. A method and apparatus for controlling stator tooth activation based, at least in part, on corrections and offsets is also disclosed.

20 Claims, 13 Drawing Sheets

OFFICIAL SENSOR OUTPUT:

| 1 | 2 | 3 |
|---|---|---|
| ON | OFF | OFF |
| ON | ON | OFF |
| OFF | ON | OFF |
| OFF | ON | ON |
| OFF | OFF | ON |
| ON | OFF | ON |

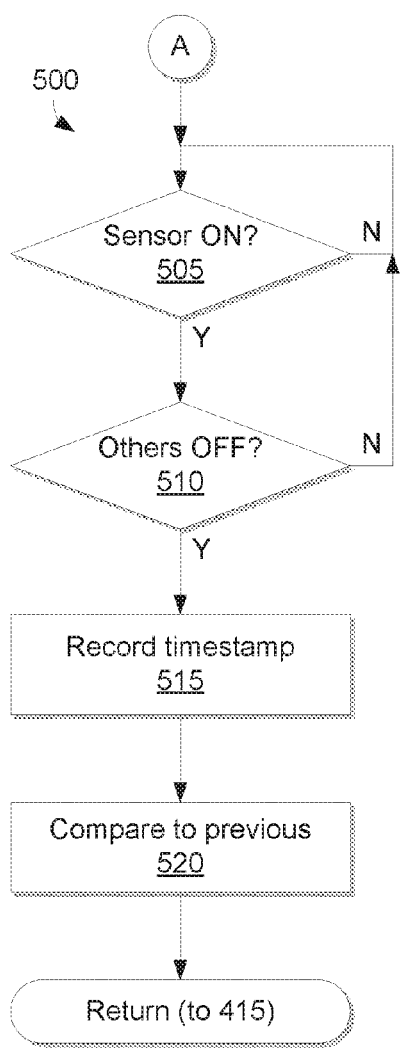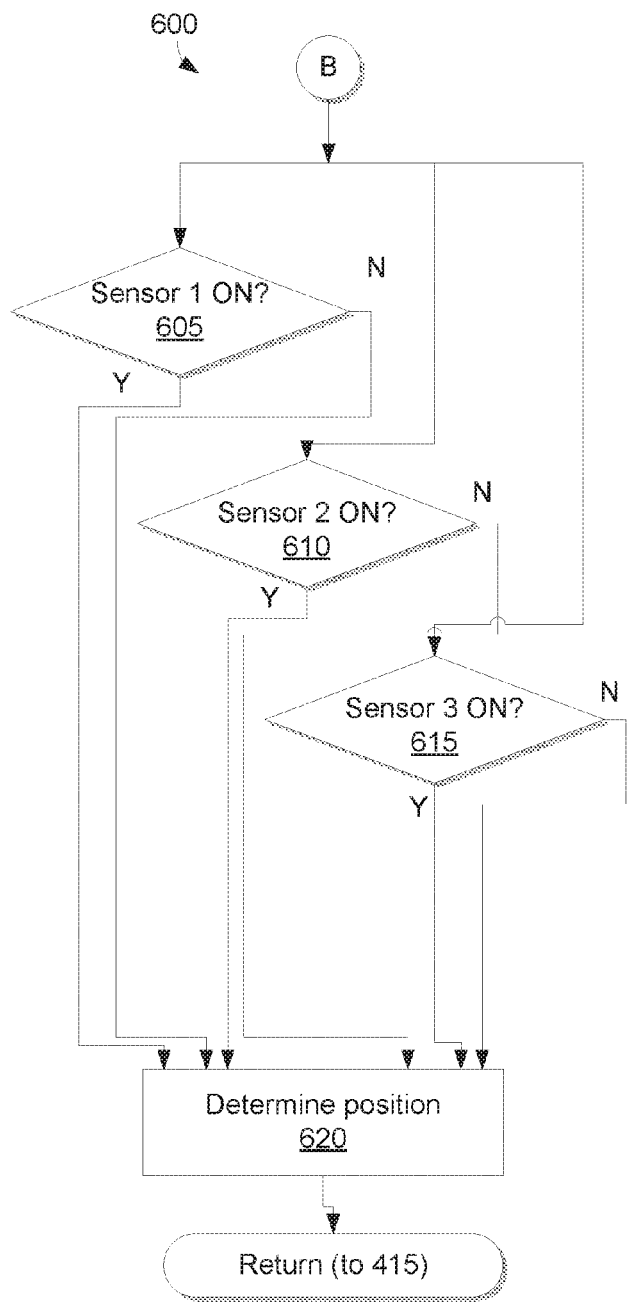
FIG. 5
FIG. 6

ROTOR CONTROL METHOD AND DEVICE

FIELD

This disclosure relates to electric motors and more specifically to error detection and/or correction of rotor alignment estimations and rotor control processes.

INFORMATION

Electric motors are increasingly prevalent and may be found in an increasing number of applications. Electric motors generally have a rotating portion, referred to as a rotor, which may be used to drive a motor component, such as via a drive shaft coupled to the rotor. Electric motors also generally have a static portion, referred to as a stator. Electromagnetic fields may be formed, such as on a portion of a stator, and the resulting force interaction between a portion of a rotor and the formed electromagnetic field may provide a torque on the rotor, such that it may rotate with respect to the stator. Transmitting one or more current pulses to a coil winding wrapped about a stator tooth, referred to herein as activating a stator tooth, may form one or more electromagnetic fields relative to the stator tooth. Because electromagnetic fields formed by activating an incorrect stator tooth and/or at an incorrect time may impede intended rotation of a rotor, it may be desirable to activate specific stator teeth and to do so at specific times. In some cases, rotor position and speed are factors upon which pulse timing decisions may be made. It may therefore be desirable for electric motors to have a mechanism to facilitate rotor speed and/or position determinations. Some sophisticated rotor speed and/or position detection processes, error detection, and/or error correction processes may comprise resource intensive aspects and/or may involve cost-prohibitive components (e.g., processing elements, memory, etc.). Therefore, there may be a desire for methods of detecting errors, providing correction (e.g., offsets), and/or controlling rotor rotation with few resources, less expensive components, and/or minimal processing power.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings in which:

FIG. 5 is a flow diagram of a method embodiment for determining rotor speed;

FIG. 6 is a flow diagram of a method embodiment for determining rotor position;

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

Figure 1:
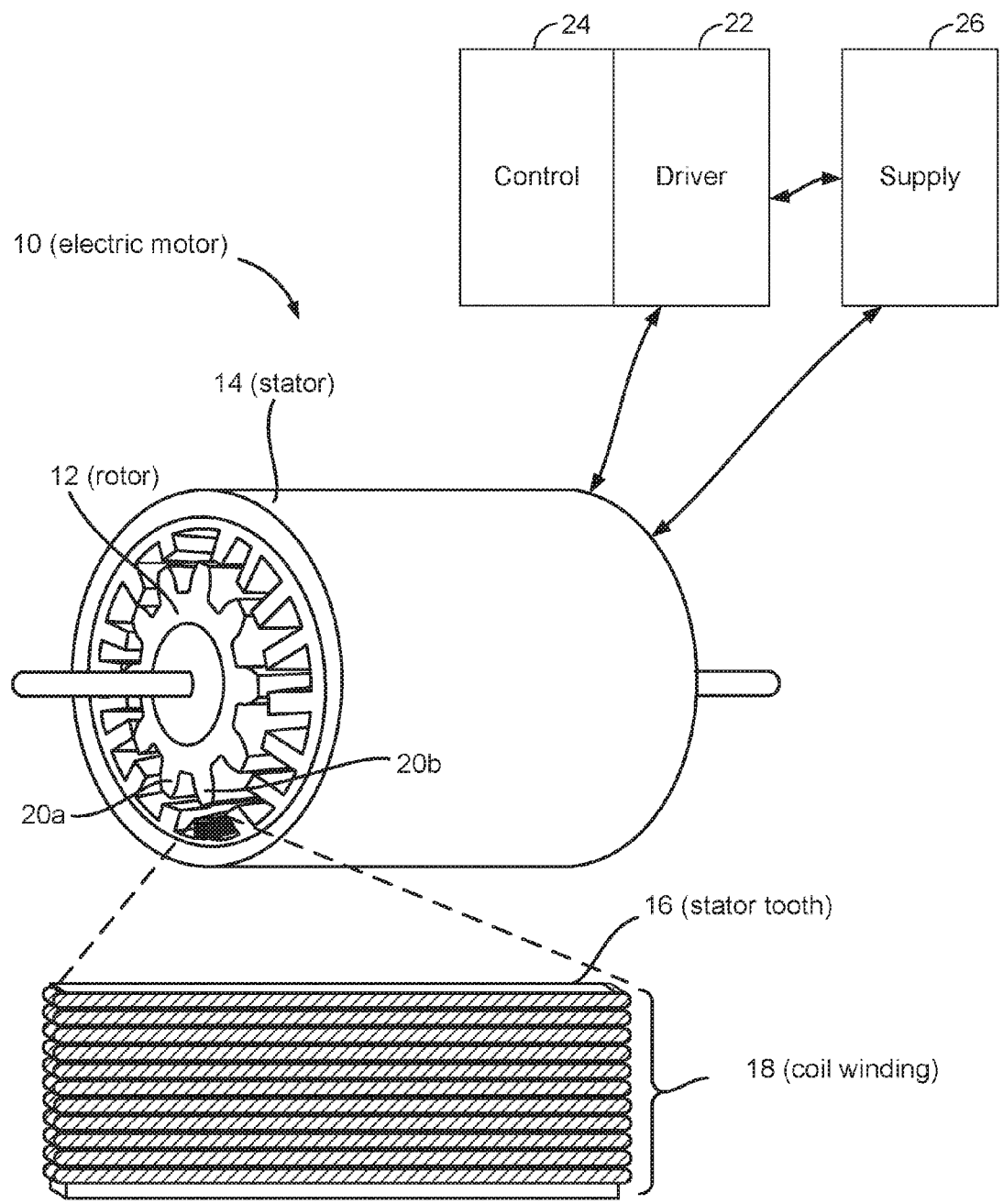
FIG. 1 is an illustration of an embodiment of an embodiment of an electric motor.

Electric motors, such as electric motor 10 in FIG. 1, may comprise one or more portions for providing a torque to a drive shaft. For instance, electric motor 10 may comprise a stator 14 having a plurality of stator teeth 16, of which one stator tooth 16 is shown below electric motor 10 for ease of illustration. One or more coil windings 18 may be wrapped around stator tooth 16. It is to be understood that although coil winding 18 is only illustrated around one stator tooth 16, this is only done for ease of illustration and coil windings 18 may be wrapped around additional, if not all, of stator teeth 16. A rotor 12 may have a plurality of rotor teeth, such as rotor teeth 20a and 20b, which may be in proximity to stator teeth 16. Rotor 12 may be capable of rotational movement, which may in turn provide rotational movement to a drive shaft connected to rotor 12. Control circuitry, such as control 24, driver 22, and/or supply 26 may be electrically coupled to coil windings 18. For example, one or more current pulses may be driven from driver 22 through coil windings 18 and may induce formation of an electromagnetic field and an electromagnetic force (EMF) in proximity to coil winding 18. The induced EMF may interact with one or more rotor teeth, such as rotor teeth 20a and/or 20b, and may thus provide a torque to rotor 12. For simplicity, pulsing current through coil windings 18 of a stator tooth 16 is referred to hereinafter as "activating" stator tooth 16. Thus, for example, an active or activated stator tooth may refer to a stator tooth 16 with coil windings 18 through which current pulses are transmitted. As noted, an EMF may be formed on an active stator tooth 16, which may provide a torque on rotor 12.

Figure 2A:
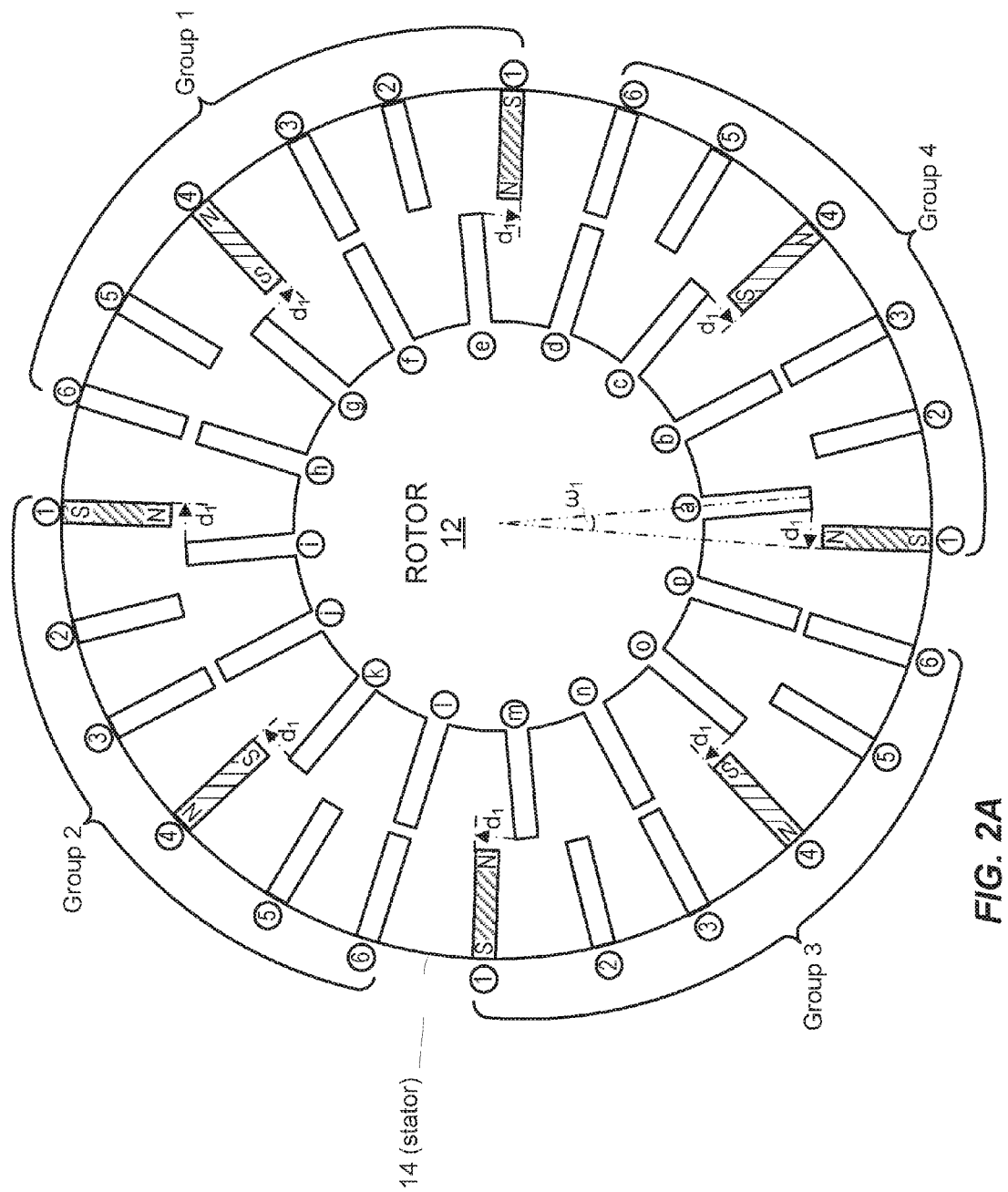
FIGS. 2A-2C are illustrations of an embodiment of a rotor and a stator.

In one embodiment, due at least in part to symmetry of stator 14, a plurality of stator teeth may be activated at approximately a same time, such as to achieve desired motor power characteristics. Referring, for example, to FIG. 2A, a first set of stator teeth 1 of groups of stator teeth 1-4 may be activated at approximately a same time to yield a torque on four different rotor teeth (rotor teeth a, e, i, and m in FIG. 2A). Similarly, again referring to the example of FIG. 2A, a second set of stator teeth 4 of groups of stator teeth 1-4 may also be activated at approximately a same time (but potentially having a different orientation than the first set of stator teeth 1 of groups of stator teeth 1-4) to yield a torque on four other rotor teeth (e.g., rotor teeth c, g, k, and o in FIG. 2A). As such, in one or more embodiments, it may be possible to engender EMF on one or more stator teeth 16 in a coordinated manner, such as by activating corresponding stator teeth in different groups of stator teeth (e.g., groups 1-4 in FIG. 2A), so as to induce clockwise rotation of rotor 12, by way of example. Of course, timing and coordination of activation of stator teeth (e.g., current pulses to coil windings 18), may change based at least in part on a particular electric motor embodiment (e.g., a number of stator and/or rotor teeth), and rotor movement (e.g., rotor speed and/or alignment).

In contrast to the foregoing explanation, an incorrect and/or uncoordinated activation of stator teeth may provide torque to rotor 12 at undesired times and/or in an undesired orientation and/or to an incorrect rotor tooth. For example, and referring again to the particular rotor alignment of FIG. 2A, if stator teeth 2 and 5 of groups of stator teeth 1-4 were activated instead of stator teeth 1 and 4, torque would be applied to rotor 12, such as causing rotor 12 to rotate in a counter clockwise direction (e.g., opposite the direction shown in FIG. 2A). While formation of an EMF on stator teeth 2 and 5 of groups of stator teeth 1-4 may be appropriate for a rotor alignment shown in FIG. 2B to initiate or maintain clockwise rotation of rotor 12, in FIG. 2A, activation of these sets of stator teeth may have an undesirable effect, such as to stop or otherwise hinder clockwise rotation of rotor 12. As should be apparent, then, incorrect EMF formation, such as at an undesired time or if a rotor tooth is not in an expected position relative a stator tooth, may impede desired operation. In some electric motor embodiments, incorrect pulse timing may damage or break supporting circuitry, such as driver 22, supply 26, and/or control 24 electric motor 10 of FIG. 1, by way of example. For instance, it may be possible to exceed an operating capacity of driver 22 by providing current pulses to a coil winding 18 without allowing coil winding 18 to fully discharge and thus potentially introducing excessive current loads into driver 22, by way of non-limiting example.

There may be a desire, therefore, for a reliable indication of position and/or speed of rotor 12 so as to avoid activating stator teeth incorrectly. For instance, referring to FIG. 1, to provide rotational movement to rotor 12, an indication as to alignment of rotor teeth 20a and 20b relative stator tooth 16 may be desirable (e.g., such that formed EMF contributes to desired rotor rotation rather than impeding rotation). A number of mechanisms may be available to provide rotor position and/or speed estimates. For simplicity, rotor position and/or speed determination mechanisms are referred to hereinafter as rotor position sensing mechanisms. One possible rotor position sensing mechanism may comprise a rotor position sensor. Example position sensors may be capable of determining an absolute position of a rotor, such as in degrees or radians, relative to a stator, by way of example. One form of position sensors used by switched reluctance motors may include absolute rotary encoders. For instance, robust and/or highly accurate rotor position sensors may be capable of providing reliable rotor speed and/or position estimations. However, such rotor position sensing mechanisms may be expensive and/or complex. Example sensors that may be robust and/or accurate (but potentially prohibitively expensive) may include contactless magnetic position sensors, by way of non-limiting example.

Figure 2B:
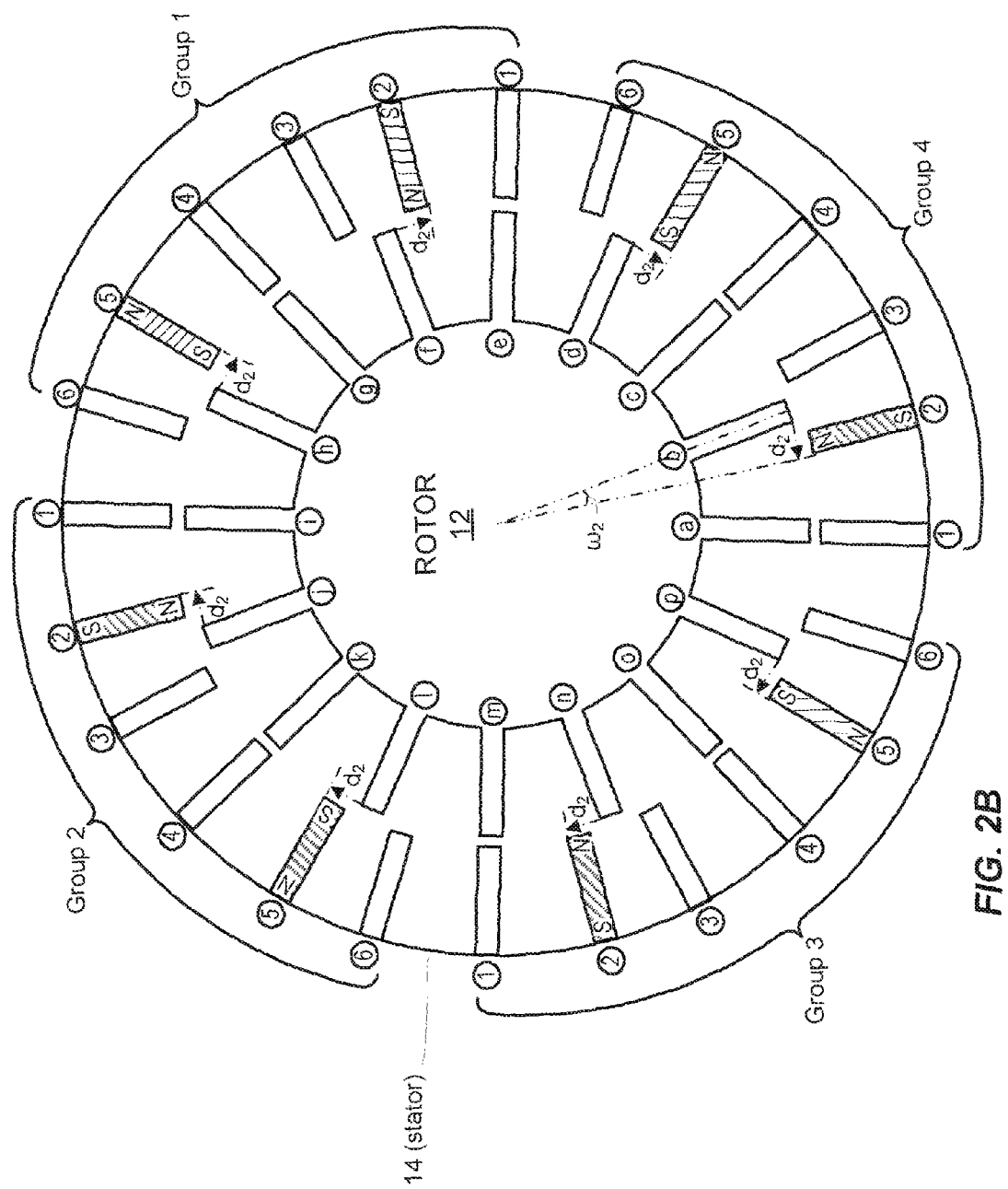
Figure 2C:

Rather than attempting to detect an absolute rotor position, an alignment sensing mechanism may be capable of detecting alignment of rotor and stator teeth and may be usable, such as for pulse control and timing. For instance, an alignment sensing mechanism may be capable of detecting alignment of a rotor and stator tooth that is such that an axis intersecting the stator tooth also intersects an approximate center of the rotor tooth in proximity to the stator tooth. For example, referring to FIG. 2A, stator tooth 3 of group of stator teeth 4 may be determined to be aligned with rotor tooth b using an embodiment of an alignment sensing mechanism as is discussed hereinafter. Alignment sensing mechanisms may also be able to detect partial alignment, such as illustrated in FIG. 2C by stator tooth 2 of group of stator teeth 4, which is shown as only partially aligned with rotor tooth b (e.g., central axes of stator tooth 2 and rotor tooth b are not aligned but portions of stator tooth 2 and rotor tooth b still overlap). Example alignment sensing mechanisms may include sensorless sensing mechanisms, coil sensors, and optical sensors, by way of non-limiting example.

Certain alignment sensing mechanisms, though potentially less expensive than rotor position sensing mechanisms, may be less accurate than more robust and/or sophisticated sensing systems (e.g., absolute position sensing systems) and may thus be less desirable in some cases despite their reduced cost. However, in spite of potential accuracy advantages of certain position sensing mechanisms, alignment sensing mechanisms may be advantageous for enabling "sensorless" alignment and/or speed estimation mechanisms, for example. By way of non-limiting example, an example sensorless alignment sensing mechanism may comprise a mechanism capable of sensing changes in inductance levels as rotor teeth rotate in relation to one or more coil windings of stator teeth 16 of stator 14. As used herein, "sensorless" alignment sensing mechanisms refer to mechanisms for which alignment of rotor and stator teeth is estimated using existing components of an electric motor, such as by using coil windings 18 of electric motor 10. For example, a sensorless alignment and/or speed estimating mechanism may determine rotor alignment without using independent sensors (e.g., contactless magnetic position sensors, optical sensors, etc.). In one electric motor embodiment, such as illustrated in FIGS. 2A-2C, sensorless operation may be possible in embodiments in which stator teeth are activated when unaligned with rotor teeth (e.g., while stator teeth aligned with rotor teeth are not activated, thus potentially freeing the coil windings of the aligned stator teeth to be operable to sense changes in inductance). Thus, in some implementations, such as to minimize cost and/or complexity, it may be desirable to use an alignment sensing mechanism with an inexpensive sensing mechanism (e.g., such as using a "sensorless" mechanism) in spite of potential for erroneous readings. For example, error detection and/or correction may be used to reduce potential for erroneous rotor alignment estimations. A number of electric motor embodiments are discussed herein that may enable sensor error detection and/or correction using, at least in part, an alignment sensing mechanism, such as using inexpensive sensing devices or "sensorless" mechanisms, for example. Such alignment sensing mechanisms may enable determination of rotor alignment and/or speed within an acceptable threshold of accuracy. Of course, claimed subject matter may also be used in conjunction with position sensing mechanisms, without limitation.

Figures 3A, 3B:
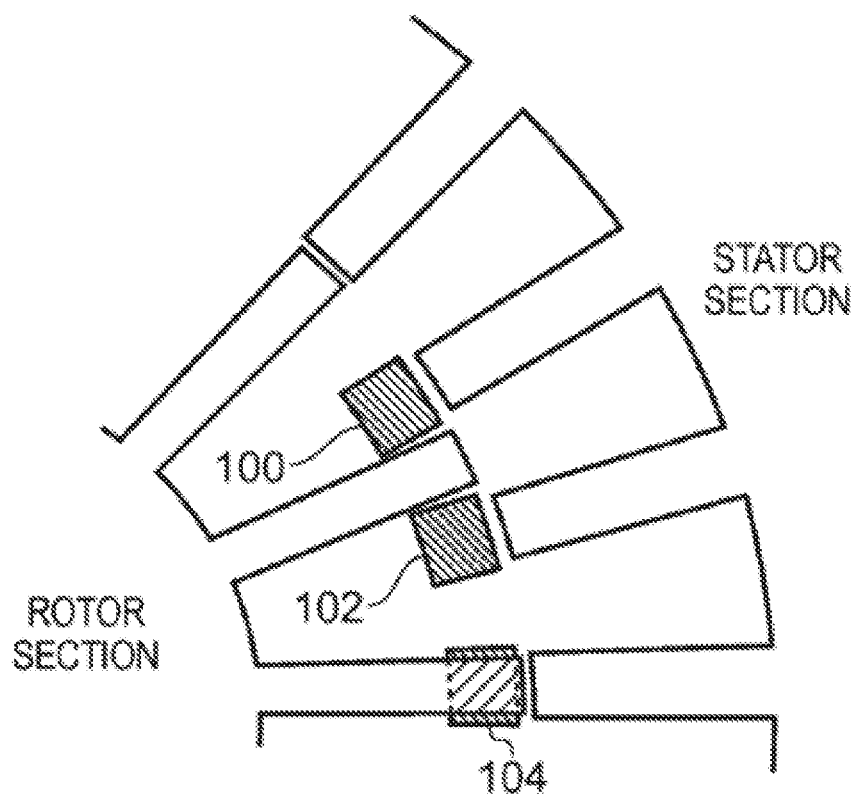
FIG. 3A is a schematic illustration of placement of three sensors of an electric motor in one example embodiment.
FIG. 3B is a table showing possible sensor outputs for the three sensors shown in FIG. 3A.

Three sensors, 100, 102, and 104 are illustrated in FIG. 3A (and sample output values of which is illustrated in FIG. 3B) to demonstrate an example alignment sensing mechanism capable of providing alignment estimations descriptive of rotor and stator tooth alignment. FIG. 3A shows an embodiment with three sensors 100, 102, 104, which may comprise optical sensors, coil sensors, or other like sensors capable of providing alignment estimations. Sensors 100, 102, and 104 may be arranged in proximity to three stator teeth, and sized and calibrated such that if a rotor tooth is aligned with a stator tooth, only one sensor registers the presence of a rotor tooth (e.g., sensor 104 in FIG. 3A). Partial alignment of rotor and stator teeth may also be detectable in the embodiment of FIG. 3A, such as is illustrated by the rows of sensor readings in FIG. 3B in which two sensors output an "ON" value. In one alignment estimating embodiment, if stator and rotor teeth are partially aligned, at most two of sensors 100, 102, or 104 may register a rotor tooth. Additionally, it is noted that in sensorless rotor alignment sensing embodiments, alignment of rotor and stator teeth may be detected in areas of detection, which may be similar to the areas of detection of sensors 100, 102, and 104. Therefore, discussion of sensors 100, 102, and 104 is not to be taken in a limiting sense and may also be applied to sensorless embodiments, for example.

A three sensor implementation, such as is illustrated in FIGS. 3A and 3B, may be such that a relative orientation (e.g., alignment) of a rotor to a stator may be determined to within 3.75° for an embodiment with 16 rotor teeth and 24 stator teeth using only three sensors (e.g., providing three bits of information—possibly after analog to digital conversion, depending on a type of sensor used). Moreover, in some cases, there may be no intermediate alignment patterns (such as shown by way of example in FIG. 3B, discussed hereinafter) available. Consequently, if a rotor were stopped, its alignment may be readily determinable, such as to facilitate activation of stator teeth to provide torque to the rotor so that it may begin to rotate.

FIG. 3B shows possible sensor outputs for sensors 100, 102, and 104 as a rotor rotates with respect to a stator according to one implementation. It is to be understood that while detection of a rotor tooth is described in a binary on/off notation, in which a rotor is either detected or not detected, in some embodiments it may be possible to use sensors that produce analog signals. The analog signals may be used directly, such as to determine rotor alignment, or may be converted to binary signals, for example. Thus, for instance, an analog-to-digital converter (ADC) may be used to convert analog signals from one or more sensors 100, 102, or 104, to digital signals. In one embodiment, a sensor, such as one of sensors 100, 102, or 104, may be capable of generating signals responsive to detection of electromagnetic radiation (e.g., light) within a particular spectrum (e.g., frequency). For example, sensor 104 shown in FIG. 3A may detect electromagnetic radiation reflected from a particular rotor tooth responsive to which one or more signals may be generated and transmitted to control circuitry, such as control 24 in FIG. 1. In one embodiment, signals generated by sensors 100, 102, and 104 may be transmitted to an ADC arranged between sensors 100, 102, and 104 and control 24. In an alternative embodiment, however, control 24 may be capable of receiving analog signals from sensors 100, 102, or 104, and either using the received analog signals directly or converting the received analog signals into digital equivalents using, for example, instructions executable by a processing element of control 24. In other examples, sensors 100, 102, and/or 104 may be capable of detecting inductance, for example.

As used herein, the term 'ON' in the context of a sensor, such as sensors 100, 102, or 104, refers to detection of a rotor tooth within an area of detection (e.g., field of view) of the particular sensor. An area of detection refers to a particular area in which a sensor may be capable of detecting an object. Likewise, the term 'OFF' in the context of a sensor, such as sensors 100, 102, or 104, refers to a case in which no rotor tooth is detected within the particular sensor's area of detection (e.g., field of view). Thus, in the context of the example arrangement illustrated in FIG. 3A, sensor 100 may transmit one or more signals corresponding to 'OFF,' sensor 102 may transmit one or more signals corresponding to 'OFF,' and sensor 104 may transmit one or more signals corresponding to 'ON.' This particular pattern of signals, OFF, OFF, and ON, from sensors 100, 102, and 104 may be usable by a controller, such as control 24, to determine a rotor alignment relative a particular portion of a stator.

Returning to FIG. 3B in which column 1 corresponds to sensor 100, column 2 corresponds to sensor 102, and column 3 corresponds to sensor 104, a list of six possible rotor positions is provided for a particular rotor/stator embodiment comprising 16 rotor teeth and 24 stator teeth. As noted above, it may be possible to determine rotor alignment within approximately 3.75° of accuracy using the six possible rotor alignment patterns illustrated in FIG. 3B in one embodiment. Also, as should be apparent, a rotor alignment sensing mechanism capable of yielding alignment patterns such as those in FIG. 3B, may also be useful for allowing determination of rotation direction (e.g., clockwise or counter clockwise), based, at least in part, on alignment pattern order. Such rotation direction determinations may not be possible in at least some electric motor embodiments. Nevertheless, it is to be understood that any number of possible sensors, such as, for example, contactless magnetic sensors, "sensorless" sensing mechanisms, optical sensors, coil sensors, etc., are contemplated by the present description.

In some cases, one or more rotor alignment estimations based at least in part on sensor readings may be potentially erroneous. For example, one or more of the outputs shown in FIG. 3B may be potentially erroneous. At times, erroneous sensor readings may lead to activation of incorrect stator teeth and/or incorrect stator tooth activation timing, by way of non-limiting example. Therefore, there may be a desire to provide a mechanism for identifying and/or handling potentially erroneous sensor (or sensorless) position or alignment determinations. Furthermore, typical electric motor control systems tend to be relatively simple and may lack processing and/or memory capabilities for running sophisticated and/or robust error detection processes. Therefore, there may also be a desire for an error detection and/or compensation process that may be executed using minimal processing and/or memory resources. A sample process for detecting and/or correcting erroneous sensor signals is thus discussed hereinafter, and may allow error detection and/or handling using few resources (e.g., limited processing and/or memory resources).

It may be useful to consider different sources of erroneous sensor readings. The following discussion refers to example rotor alignment sensing mechanisms (e.g., referring to rotor and sensor alignment), however, it is to be understood that in many cases the following principles may apply equally to rotor position sensing mechanisms. Thus, for example, in one case, potentially erroneous sensor readings may be a result of incorrect sensor placement. By way of example, sensors usable for detection of rotor alignment, timing, and/or speed may not necessarily be placed at intended locations. For example, sensor placement variance in electric motors may yield relatively significant inaccuracies in rotor alignment, timing, and/or speed determinations (e.g., on the order of multiple mm or more). An additional source of potentially erroneous sensor readings may include sensor area of detection variance. For example, an area of detection (e.g., field of view) for sensors 100, 102, and 104, may vary from one sensor to the next. An example optical sensor may be able to detect a wider surface area than another example optical sensor, for instance. Thus, by way of example, one sensor might be more sensitive than another, such as by being able to receive electromagnetic radiation over a larger surface area than another sensor, for example. Sensor placement and area of detection variances (e.g., between one or more sensors of an electric motor) may yield relatively inaccurate alignment, timing, and/or speed determinations, which may, in turn, yield undesirable operation.

In order to detect and handle errors, one or more timestamps may be used in order to determine speed (e.g., timing), alignment, and/or any correction or offsets, for example, in an error detection and/or correction process. The use of such timestamps may allow error handling to be conducted in a relatively uncomplicated manner, such as without having to perform complicated mathematic calculations (e.g., such as to potentially not calculate rotor speed and/or acceleration). Additionally, one or more counters or flags of some sort may be used for detection of potentially erroneous sensor readings. An error counter may allow control 24 to manage stator tooth activation (e.g., transmission of current pulses) such that current pulses may not be transmitted if potentially erroneous rotor alignment, timing, and/or speed determinations are detected. Additionally, it may be desirable to compensate for processing time while making pulse timing determinations. The processing offset may then be used in calculations for determining pulse timing in some cases.

FIGS. 2A-2C may be instructive to understand how the foregoing example offsets may be used in determining stator tooth activation control and/or timing. For example, FIGS. 2A-2C illustrate rotational angles $\omega_1$, $\omega_2$, and $\omega_3$. These rotational angles indicate a rotational angle that it may be expected that a rotor will travel in a unit of time based, at least in part, on estimated rotor alignment and speed values. In one embodiment, taking offsets into consideration while determining pulse timing may comprise: adding or subtracting determined alignment offset values (e.g., correction values) to rotational angles to yield a corrected rotor alignment estimation, which may be used in providing pulses to stator teeth. For instance, if a rotor alignment offset is determined to be approximately 0.05°, then this value may be added or subtracted from the relevant angular distance value (e.g., $\omega_1$). Thus, for example, if it is determined that the rotor is actually aligned at approximately 0.05° behind an expected value, then alignment estimations may be altered such as follows: $\omega_1$-0.05°, for example. Of course, this is but a simple example and subject matter is not intended to be limited to this example.

It is noted that performing alignment calculations, such as using degrees or radians of alignment, may use relatively significant computing and/or memory resources. Therefore, in one embodiment, rather than determining an offset in terms of rotational distance or angles, an offset may be determined in terms of units of time. For example, if a time to travel angular distance $\omega_1$ is $t_1$, and an offset is $t_{off}$, then a resulting value may be represented as $t_1-t_{off}$. It should be appreciated that such a simplification may be desirable, such as to reduce processing (e.g., potentially avoiding computing-intensive multiplication or division) and/or memory (e.g., storing select timestamps may use fewer memory resources than storing rotor alignment values, averages, etc.) considerations. With this in mind, the following discussion refers to offset and alignment values in terms of units of time, potentially represented as timestamps. Furthermore, it is noted (and is discussed in greater detail hereinafter) that due to structural consistency of rotors and stators (e.g., stator teeth and rotor teeth may have approximately a same respective width and respective spacing), rather than making rotor speed determinations at different times, rotor speed may also be represented by a time value (e.g., a first rotor speed may be characterized by a first difference in time, $\Delta t_1$, between alignment of rotor teeth with a first stator tooth, a second rotor speed may be characterized by a second difference in time, $\Delta t_2$, between alignment of rotor teeth with a second stator tooth, etc.).

Figure 4:
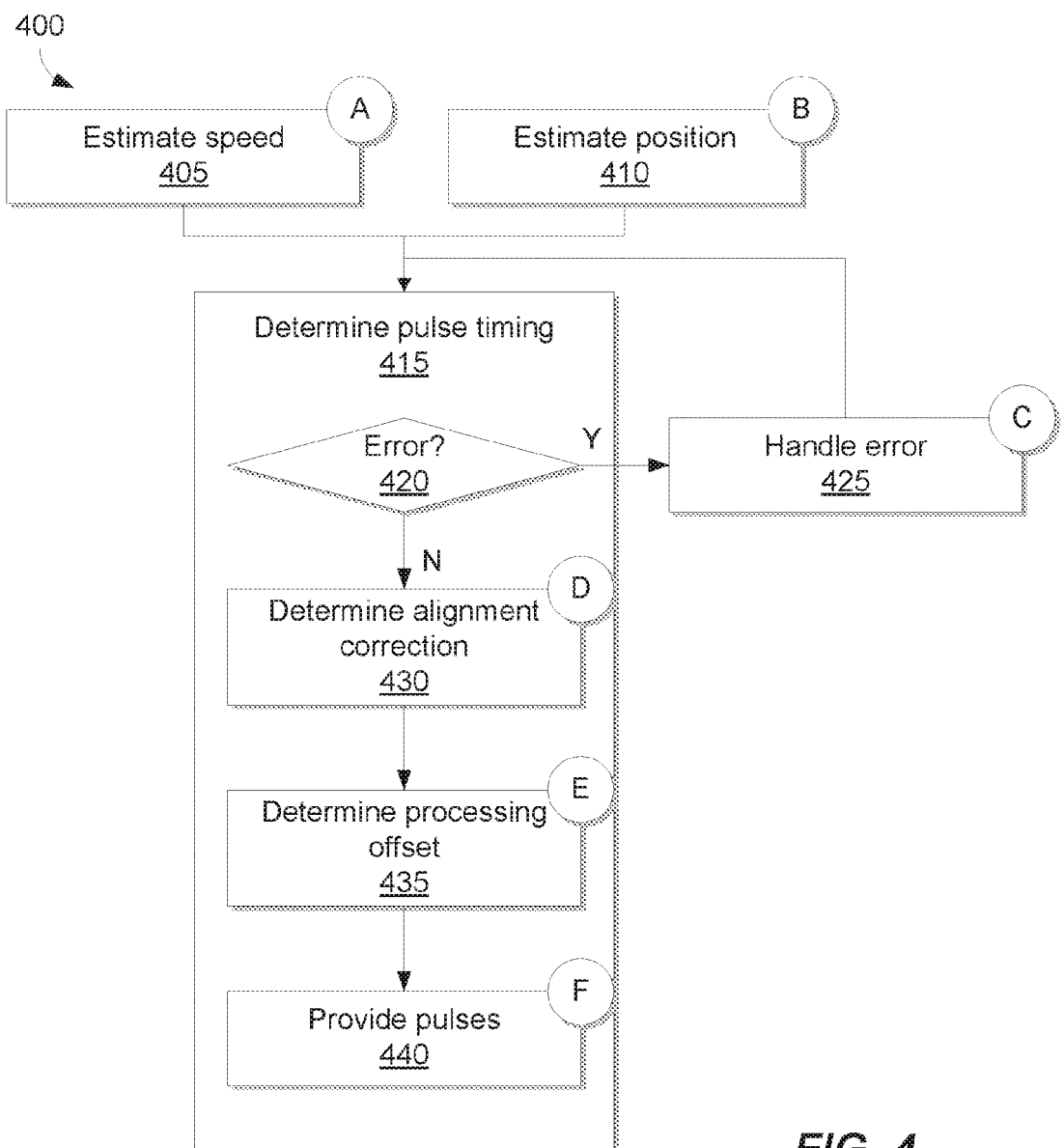
FIG. 4 is a flow diagram of an embodiment of a method for providing current pulses to coil windings of an electric motor having error checking and correction.

FIG. 4 shows an example method 400 for using one or more sensor signals to provide current pulses to coil windings (e.g., activating selected stator teeth), such as coil windings 18 of FIG. 1. Briefly, method 400 comprises using determined rotor speed and/or alignment estimations at blocks 405 and 410, such as using a plurality of timestamps, to determine pulse timing for activating selected stator teeth of an electric motor, such as electric motor 10 of FIG. 1, at block 415. As noted, rotor speed and/or alignment values determined at blocks 405 and 410 may be determined in terms of units of time. For instance, because distance between stator and/or rotor teeth may be constant, in at least some cases, a distance term in speed determinations may be omitted, leaving only a timing term. In one implementation, it may be possible to identify a stopped rotor at speed estimation block 405. For instance, in one embodiment, if no speed value is determinable during a window of time, then rather than running an entire error detection and/or correction routine, it may be determined that a rotor is stationary. Determined pulse timing may be run through an error checking routine, and determined alignment offsets may be used to revise determined pulse timing. Example method embodiments 500 and 600, corresponding to blocks 405 and 410 are discussed hereinafter. In an alternative embodiment, an error checking routine may be performed prior to determine pulse timing at block 415. Additionally, it is noted that while blocks 420-440, discussed hereinafter, are illustrated as occurring within a pulse timing determination framework (e.g., within block 415), this is merely for ease of illustration. These blocks may be accomplished independently of pulse timing determinations, such as illustrated by block 415.

At block 420, an error detection routine may run to determine whether rotor alignment determinations are potentially erroneous, for example. In one embodiment, for example, if a rotor tooth is not detected in an expected window of time (e.g., a window of time at block 420 may be less than a window of time used to determine whether a rotor is stationary), then a counter may be incremented (e.g., an error counter) or a flag may be raised within a memory structure. If an erroneous condition exists, then at block 420 an error handling routine may be triggered, such as shown by block 425. One example embodiment of blocks 420 and 425 is discussed hereinafter in relation to method embodiment 700 of FIG. 7. In one embodiment, while such an error handling routine is running, electric motor 10 may refrain from providing additional current pulses to stator teeth, such as until an error counter or flag is cleared. If it is subsequently determined that a rotor is stationary, then any counts in an error counter may be cleared and it may be assumed that the detected estimated alignment is sufficiently accurate to use in determining stator teeth to activate and pulse timing, such as to commence rotor rotation.

Assuming that an error counter is empty, one or more alignment corrections may be determined. The alignment correction may be used to adjust determined alignment in a pulse determination routine, such as at block 415. In one embodiment, an alignment correction may be determined at block 430 and applied to rotor alignment and/or speed estimates or may be used to revise a determined pulse timing. In one implementation, alignment correction may be determined by saving a timestamp each time a rotor tooth passes a sensor (e.g., three timestamps for embodiments with three sensors). The timestamps for a particular sensor may be used in finding a sensor "middle," such as by averaging start and stop times. The sensor middle determined using timestamps may be compared with a predicted middle, such as may be based on an expected sensor location and area of detection (e.g., field of view), in order to yield an alignment correction factor or offset. For instance, in one embodiment, the predicted middle may be 0.05° clockwise from a determined middle, and this determined difference may be added to or subtracted from rotor alignment determinations (e.g., based on rotor rotation direction) to yield a corrected rotor alignment value. As noted above, in some cases an offset may be expressed in terms of units of time. Thus, rather than a rotational distance offset, a time-based value may be added or subtracted from determined timing values (e.g., timing of alignment of one or more stator and rotor teeth). In some implementations, the alignment correction may be calculated once, continually, or periodically, and applied to alignment determinations usable for determining current pulse timing, for example. An example method embodiment 800 for determining an alignment correction as shown at block 430 is discussed hereinafter in conjunction with FIG. 8.

Figure 9:
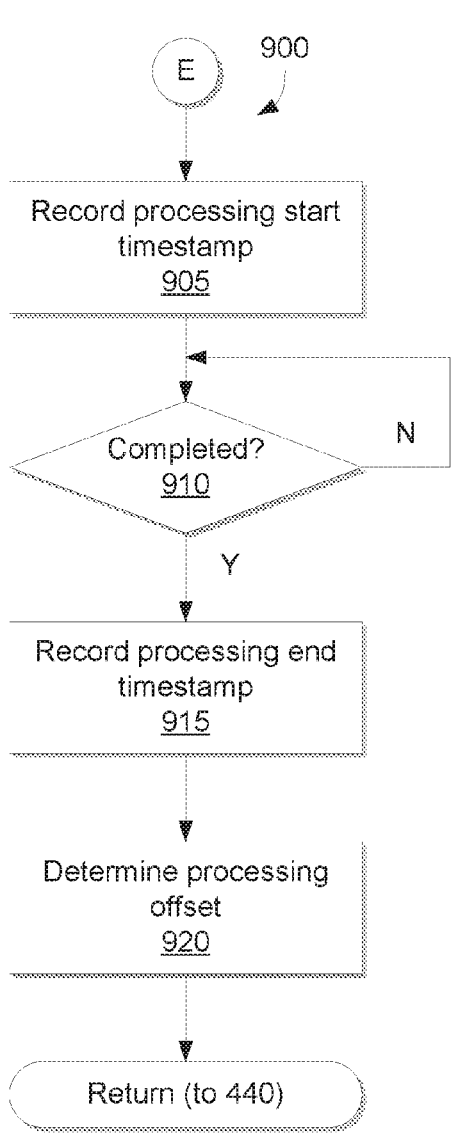
FIG. 9 is a flow diagram of a method embodiment for determining a processing offset.

As introduced previously, in addition to sensor location and area of detection-related offsets, a processing offset may be used and may comprise time during which processing related to rotor speed and alignment determinations is performed. A processing offset may comprise processing units, (e.g., a given processing task may correspond to a given unit time value, etc.). Processing offset determination may also comprise a timestamp at the beginning of a processing period, a timestamp at the end of a processing period, and/or a difference between these values. For example, an initial timestamp for a processing offset may correspond to a last alignment timestamp, which may indicate a start of processing. A method embodiment 900 of FIG. 9 is discussed hereinafter as one possible approach for determining a processing offset, such as shown by block 435.

While the correction and offset determinations of block 430 and 435 are shown in series in FIG. 4, it is to be understood that such example offsets (among others) may be determined concurrently instead. Indeed, in one embodiment, offset determinations may be made concurrently with rotor speed and position determinations at blocks 405 and 410.

Offsets may be used in providing pulses to coil windings, such as coil windings 18, as shown at block 440. Processes for determining pulse timing are discussed hereinafter in relation to an example method 1000 in FIG. 10.

TABLE 1

| Time | Sensor | Sensor 2 | Sensor 3 |
|---|---|---|---|
| $t_0$ | OFF | OFF | ON |
| $t_1$ | OFF | ON | ON |
| $t_2$ | OFF | ON | OFF |
| $t_3$ | ON | ON | OFF |
| $t_4$ | ON | OFF | OFF |
| $t_5$ | ON | OFF | ON |
| $t_6$ | OFF | OFF | ON |
| $t_7$ | OFF | ON | ON |
| $t_8$ | OFF | ON | OFF |
| $t_9$ | ON | ON | OFF |
| $t_{10}$ | ON | OFF | OFF |
| $t_{11}$ | ON | OFF | ON |

TABLE 2

| Sensor timestamps ($TS_i$) | | | | | |
|---|---|---|---|---|---|
| Sensor 1 | | Sensor 2 | | Sensor 3 | |
| ON | OFF | ON | OFF | ON | OFF |
| $t_{0-3}$ | $t_0$ | $t_{0-5}$ | $t_{0-2}$ | $t_{0-1}$ | $t_2$ |
| $t_3$ | $t_6$ | $t_1$ | $t_4$ | $t_5$ | $t_8$ |
| $t_9$ | $t_{12}$ | $t_7$ | $t_{10}$ | $t_{11}$ | $t_{14}$ |

Tables 1 and 2, above, provide some sample illustrative values to be used in the following discussion of operation of an error detection and correction process embodiment. It is noted that for simplicity it is assumed in this example that rotational speed of the rotor is a constant approximately $\pi/24$ radians per unit time, $t_i$. Of course, as would be understood by those in the art, in complex examples, certain ON/OFF patterns may last more or fewer units of time than what is shown in Table 1. Furthermore, because rotational speed is assumed to be constant to simplify this discussion, rotational speed values are not included in tables 1 and 2. However, in other implementations, one or more tables, similar to the preceding, may be used to store values corresponding to speed of a rotor. For example, in one or more implementations, a plurality of speed estimations made based, at least in part, on measurements made at a sensor may be stored in a memory structure, may be used in a pulse determination process, and/or may be displayed to a display unit, such as an LCD screen or like devices. In one case, rotational speed of a rotor may be expressed in terms of rotations per unit time (e.g., rotations per minute (RPM)). A plurality of timestamps, speed or alignment values, etc. may be referred to as historical values. Speed values may be stored for each sensor in some implementations. For instance, in one implementation, a speed value may be determined for each sensor and a plurality of historical speed values may be stored for each sensor. In another example, and as discussed above, instead of determining speed values, a speed of rotation of a rotor may be represented by units of time (e.g., may be stored using timestamps, etc.). Speed values, such as timestamps, may be stored in a structure like an array or table in which values may be overwritten in order to use as little memory as possible. Similarly, values shown in tables 1 and 2 above may be overwritten by subsequent values in some cases.

While rotational speed of the rotor is assumed to be constant for this example, the following explanation as to how speed might be determined according to one implementation is provided. Of course, as noted, in some cases it may be possible to perform error detection and correction without calculating rotor speed. Instead, speed detection, such as may be performed at block 405, may comprise determining timing, such as a period of time between a first time that a rotor tooth is aligned with a given stator tooth and a next time that a rotor tooth is aligned with the given stator tooth. Method 500, corresponding to an embodiment of block 405 (indicated with an A) is shown in FIG. 5. As discussed above, some sensors may be offset slightly (e.g., in relation to a stator tooth) and/or may have different areas of detection (e.g., field of view). Therefore, determining speed (or timing) by using more than one sensor might introduce error into a speed determination, such as due at least in part to sensor offset and/or sensor detection area variations. Instead, the present description proposes using values (e.g., time stamps) determined at a single sensor to yield rotor speed (e.g., timing between alignment of consecutive rotor teeth with a given stator tooth). Thus, in one implementation, method 500 may be determined independently at each sensor, such as sensors 100, 102, and 104.

Turning to the blocks of method 500, for a given sensor, a determination may be made as to whether the sensor is "ON" (e.g., whether a rotor tooth is detected within a sensor's field of view) at block 505. Using the values in Table 1 and sensor 1 to illustrate one example of how this may be done, at times $t_0$, $t_1$, and $t_2$ at block 505, it may be determined that sensor 1 is not ON (e.g., sensor 1 is OFF). Method 500 may continue to loop back to block 505 until $t_3$ at which point, sensor 1 may turn ON, indicating detection of a rotor tooth in an area of detection (e.g., a field of view) of sensor 1. Responsive to detecting that sensor 1 is ON at block 505, a determination may be made at block 510 that at $t_3$ sensors 2 and 3 are not OFF (e.g., at $t_3$ sensor 2 is also ON). Thus, method 500 may return to block 505. At time $t_4$ at block 505 it may again be determined that sensor 1 is on. And at block 510 it may be determined that both sensor 2 and sensor 3 are OFF (e.g., no rotor tooth is detected by either sensor 2 or sensor 3). In this embodiment, and as indicated above, sensors may be spaced such that when a rotor tooth is aligned with a stator tooth (and thus approximately centered in an area of detection of a sensor), the remaining sensors may be OFF. Thus, returning to method 500, if it is determined that a given sensor is ON and the remaining sensors are OFF, at block 515, a timestamp corresponding to rotor and stator tooth alignment may be recorded, such as in a memory within the control circuitry of the electric motor, by way of non-limiting example. In this case, the timestamp recorded at block 515 may correspond to a time at which sensor 1 is ON and both sensor 2 and sensor 3 are OFF. At block 520, the timestamp recorded at block 515 may be compared with a timestamp recorded previously to yield a difference value. The differences between timestamps may be used to yield a Δt value that may correspond to a "speed" value in one implementation. For example, this determination may be made by recording a timestamp corresponding to a time, $t_{align1}$, at which a rotor tooth is aligned with a given stator tooth, and recording a next timestamp corresponding to a time, $t_{align2}$, at which a subsequent rotor tooth aligned with the given stator tooth. Thus, "speed" at time $t_{align2}$ may be expressed as a difference between $t_{align1}$ and $t_{align2}$ (e.g., $\Delta t = t_{align2} - t_{align1}$). As is shown hereinafter, the Δt value may be used to determine an offset. For implementations in which it may be desired to calculate a speed (e.g., distance×time), as noted above, a distance from a midpoint of one rotor tooth to a midpoint of an adjacent rotor tooth is a constant (e.g., known) value. Thus, the difference in time, Δt, yielded at block 520 may be used along with the known radial distance between rotor teeth to yield a speed. In some implementations, the difference in time, Δt, and/or speed values may be stored in a memory and/or used in method 400. As should be appreciated, it may be advantageous to use time values, such as to reduce a number of calculations performed and/or resources used. For example, using powers of two and bitwise rotation, multiplication and division operations may be avoided in some cases. An example of such a technique is discussed hereinafter.

At block 410 of method 400 (indicated by B), a rotor alignment may be estimated. Again, in some cases, rather than using a rotor alignment value, rotor alignment may be determined using at least in part units of time, as is discussed hereinafter. Method 600 of FIG. 6 illustrates a process by which rotor alignment may be determined according to one implementation. In one embodiment, at blocks 605, 610, and 615, which may be performed approximately concurrently, it may be determined whether sensors 1, 2, and 3 (e.g., sensors 100, 102, and 104 of FIG. 3A) are ON or OFF and the ON/OFF values may be associated with timestamps. The corresponding values may be used, such as at block 620, to determine a rotor alignment, such as rotor 12 of FIG. 1, based on the ON/OFF pattern (e.g., comprising binary values) sensed by the sensors. For instance, in one embodiment, a lookup table may be consulted based on the particular ON/OFF pattern, such as is illustrated in FIG. 3B, to yield a rotor alignment estimation. In another embodiment, due at least in part to a numerical correlation between sensors and a number of phases of a particular rotor and stator arrangement, it may be possible to determine which stator tooth to activate based, at least in part, on an aligned stator and rotor teeth (e.g., activating an adjacent unaligned stator tooth for rotation in a desired direction, etc.). As discussed above, there may be inaccuracy in a rotor alignment determination. For instance, if an arrangement of a sensor and/or an area of detection of a sensor are not as expected, then the sensor may return an erroneous ON or OFF value, which may thus lead to an erroneous rotor alignment determination. For reasons such as potential rotor alignment estimation error, it may be desirable to be able to detect errors and/or correct potential errors. In any case, returning to method 600, once a rotor position is determined, the value may be transmitted, such as to block 415 of FIG. 4 for further processing.

Figure 7:
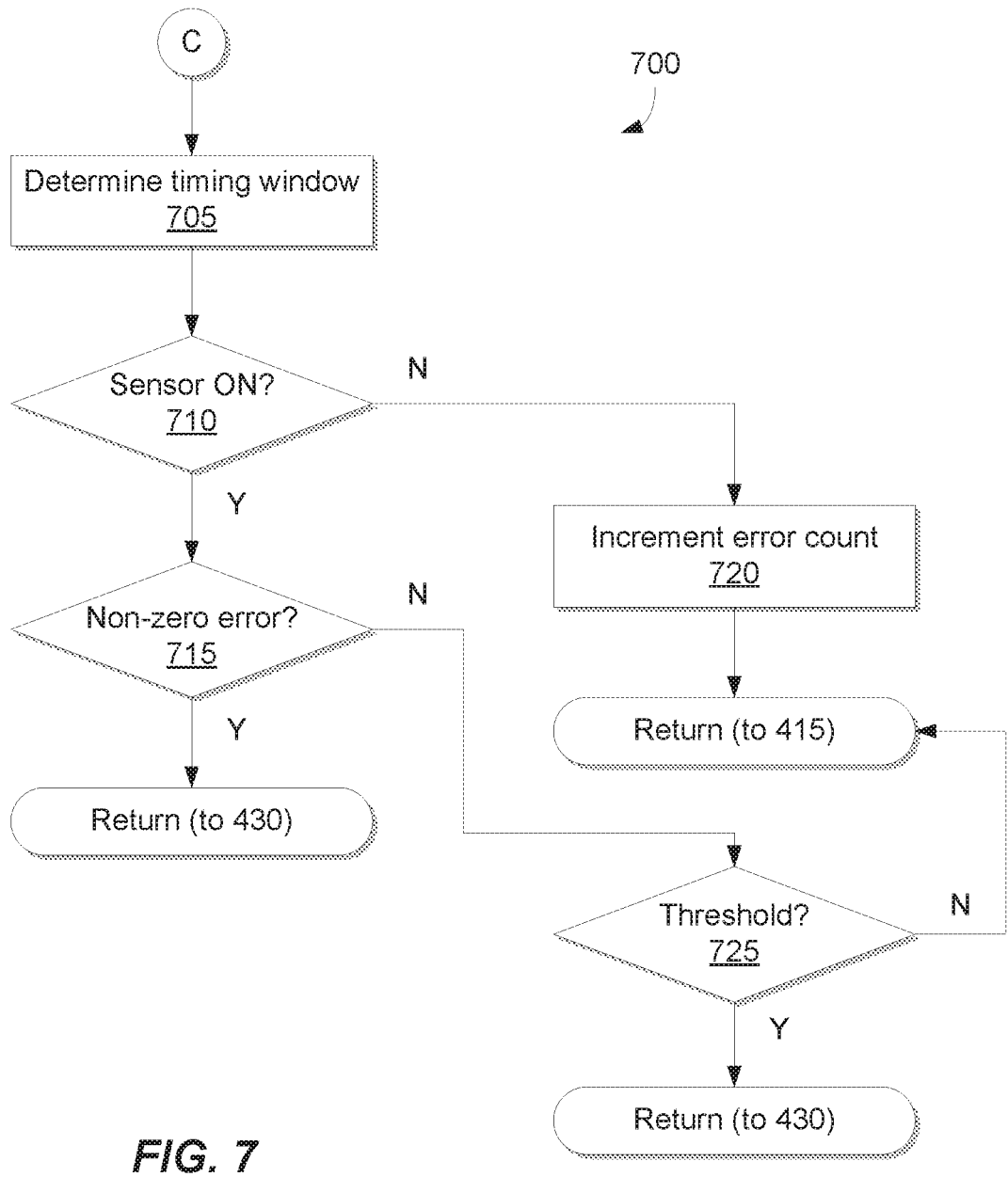
FIG. 7 is a flow diagram of a method embodiment for error detection and handling.

Method 400 illustrates an error detection process at block 420 and an error handling process at block 425 (as indicated by C). Method 700 of FIG. 7 illustrates one implementation of a process for error detection and error handling. While blocks 420 and 425 of method 400 are illustrated separately, it is noted that the respective processes may be combined in whole or in part, such as illustrated by method 700. Furthermore, it is noted that while blocks 420 and 425 are illustrated separately from other blocks, they may be performed substantially concurrently with other blocks. For example, in one embodiment, processes for blocks 420 and/or 425 may be performed in conjunction with block 405. In another embodiment, processes for blocks 420 and/or 425 may be performed substantially concurrently with block 410.

At block 705 a timing window may be determined within which a rotor tooth is expected to be detected by a sensor, such as one of sensors 100, 102, or 104. In one case, a timing window or threshold may be established taking into account estimated rotor speed and/or alignment. If a rotor is not detected within the timing window, then an error counter may be incremented to indicate potentially erroneous operation and/or estimations. In one embodiment, a timing window may be established with a lower bound that is approximately 0.75 of a previous timestamp and an upper bound that is approximately 1.25 larger than the previous timestamp. In another embodiment, a timing window may be established with a lower bound that is approximately 0.5 of a previous timestamp and an upper bound that is approximately 2 times larger than the previous timestamp. In this example, if a rotor is not detected within the timing window, then an error count may be incremented in an error counter, such as to indicate potentially erroneous sensor values, determinations, and/or operation.

At block 710, a determination may be made as to whether a rotor tooth is detected within the timing window determined at block 705. For instance, a clock or timer of control 24 may be used in conjunction with one or more sensors to determine whether a sensor detects a rotor tooth (e.g., a sensor turns ON) during a timing window. At block 720, as discussed above, if a rotor tooth is not detected within the time window, then an error count may be incremented. In one embodiment, if a non-zero value exists in an error counter, such as may be detected at block 420 of method 400 and/or block 715 of method 700, then subsequent current pulses may not be transmitted to coil windings, such as coil winding 18 of FIG. 1, until correct operation is reestablished.

At subsequent points in an error handling routine, a counter, similar to the error counter discussed above, may be used to determine whether the electric motor is operating correctly and may potentially be used at least in part in a process to clear out an error counter. For example, for times at which an error counter is non-zero, but that a rotor tooth is detected within a determined timing window, a "good" count may be incremented in a counter. In one implementation, five "good" counts indicating detection of a rotor tooth within a timing window five consecutive times may be enough to remove an error count or flag. Thus, in this example, once the error count is again empty, normal operation (e.g., transmission of current pulses) may restart.

Of course, other possible thresholds may be used. For instance, more or less than five "good" counts may be used (e.g., 3, 10, etc.). Or, in another example, a flag may be used instead. In any case, at block 725, a determination may be made as to whether a threshold (e.g., of good counts) has been met and the routine may return to block 415 or continue to block 430, accordingly.

As noted above, in some non-limiting examples, one or more sensors of an electric motor, such as electric motor 10, may not be aligned perfectly and/or the size of a detection area of a sensor may be unequal to that of another sensor. In one embodiment, it may be possible to use at least in part a sensor speed determination to detect and/or compensate for inaccuracies in a rotor alignment determination. This may be accomplished by tracking a single rotor tooth as it passes all sensors (e.g., sensors 100, 102, and 104) and by recording a timestamp at each time that the rotor tooth enters and leaves the detection area of a sensor, in one implementation.

Figure 8:
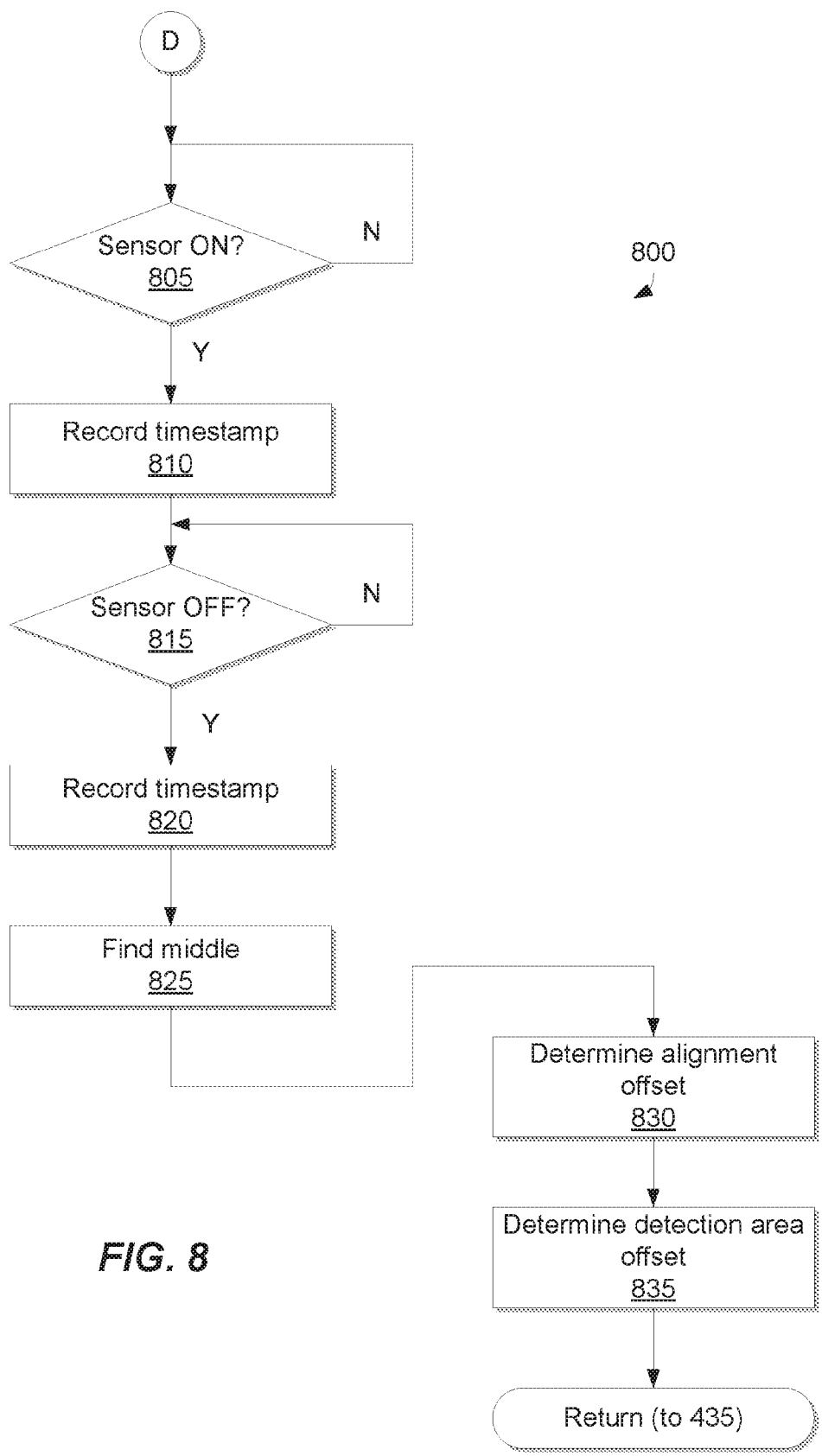
FIG. 8 is a flow diagram of a method embodiment for determining a position correction or offset.

At block 430 (indicated with a D), a determination of an alignment correction or offset may be made. FIG. 8 illustrates an example method 800 for determining an alignment correction value. At block 805, a determination may be made as to whether or not a rotor tooth is detected (e.g., whether the sensor is ON). If it is, a timestamp may be recorded corresponding to a time at which the rotor tooth was detected by the sensor. Next, if the rotor tooth leaves the field of view of the sensor (e.g., the sensor turns OFF), at block 815, a timestamp may be recorded at block 820. In one example, a limited amount of memory may be dedicated to storing timestamps, such that after recording a given number of timestamps indicating times at which sensors turn ON and OFF, subsequent timestamps may be written over previous timestamps. Because one or more subsequent rotor teeth may also enter the detection area of a first sensor before the first rotor tooth has left the detection area of a last sensor of a group of sensors, it may be advantageous to maintain a certain number of previous tracked timestamps for the sensors. Thus, for example, referring to Table 2, the rotor tooth that enters the area of detection of sensor 1 (e.g., turning sensor 1 ON) in the first row may correspond to the rotor tooth that enters the area of detection of sensor 2 (e.g., turning sensor 2 ON) in the second row, and also may correspond to the rotor tooth that enters the area of detection of sensor 3 (e.g., turning sensor 3 ON) in the third row. Thus, it may be possible to use these values in order to determine a rotor alignment correction or offset.

In one embodiment, a "middle" may be determined for a sensor, such as shown at block 825. To determine a middle for a sensor, a series of timestamps for that sensor may be compared to find a middle value. Taking, for example, the example values for sensor 1 in Table 2, a middle may be found by finding a middle for each time a rotor is detected in the sensor's field of view, and averaging the middle values to yield a middle for the sensor. For instance, a middle value in one example may be determined in one implementation by $$\frac{t_{OFF} - t_{ON}}{2},$$

where $t_{OFF}$ and $t_{ON}$ refer to times at which a sensor turns OFF and ON, respectively. Thus, a middle of the timestamps in the first row of sensor 1 in Table 2 may be determined by $$\frac{t_0 - t_{0-3}}{2},$$

etc. And a middle for a sensor may be determined in one implementation by averaging the respective middle values. Thus, the middle for the first three rows of sensor 1 in Table 2 may be determined by $$\frac{(t_0 - t_{0-3}) + (t_6 + t_3) + (t_{12} - t_9)}{6},$$

by way of non-limiting example. Similar determinations may be made for the remaining sensors. Middle values may be compared with expected middle values determined, for example, using rotor speed. Because a measure of rotor speed, such as in terms of time or in radians per unit time, may be determined with comparative accuracy, the measure of rotor speed may be used to determine a time (e.g., in seconds or milliseconds, etc.) at which a rotor tooth is expected to be aligned with a stator tooth. It is noted again that the speed determination may be made accurately in one implementation by recording (and comparing) timestamps at a single sensor, such as to avoid introducing potential sensor alignment errors into the determination.

Thus, for example, in one implementation, an expected middle, $M_E$, may be calculated for each respective sensor based at least in part on an arrangement of a stator tooth corresponding to the sensor. In one implementation it may be possible to determine the expected middle, $M_E$, with relative ease using timestamps to yield an offset as a unit of time, as opposed to, for example, using degree or radian values, as might be the case with a position sensing mechanism. For example, a first timestamp may be recorded corresponding to a time, $t_{align1}$, at which a first rotor tooth is aligned with a given sensor, and a second timestamp may be recorded corresponding to a time, $t_{align2}$, at which a subsequent rotor tooth is aligned with the given sensor. The difference between times $t_{align1}$ and $t_{align2}$ may represent a period of time between "ON" cycles of a given sensor, or $t_{sensorON}$. This value may be utilized at least in part to determine an expected time for a rotor tooth to travel from one sensor to a next sensor, $t_{rotorE}$. This value, $t_{rotorE}$, may be determined based, at least in part, on the ratio of rotor teeth to stator teeth of an electric motor. For instance, the rotor 12 and stator 14 of the electric motor of FIG. 2A have a 16:24 ratio. This ratio may be used at least partly to determine a period of time expected for a rotor tooth to travel from a first sensor to a next sensor, $t_{rotorE}$, based on a period of time calculated between ON cycles for the first sensor, $t_{sensorON}$. For example, if $t_{sensorON}$ is 1 ms, then $t_{rotorE}$ may be determined to be $$1 \text{ ms} \times \frac{16}{24},$$

or approximately 0.67 ms. The value for $t_{rotorE}$ may be compared with a time $t_{rotorD}$ corresponding to a measured time for a rotor tooth to travel from a first sensor to a next sensor. And a difference between the $t_{rotorE}$ and $t_{rotorD}$ values may yield an offset as represented by block 830 of method 800. This alignment correction may be used by a controller, such as control 24, in order to determine timing of current pulses to coil windings. For instance, in one case the determined offset may be added to or subtracted from a current pulse timing determination (e.g., corresponding to a time at which to provide a current pulse to a given stator tooth).

Of course, other methods of determining a rotor alignment offset are also contemplated by claimed subject matter. For example, in one such alternative implementation, to determine a middle for sensor 100 in FIG. 3A, a "middle" for the corresponding stator tooth may be used. In one embodiment, the expected middle for a sensor may be determined based on an assumption that the middle for a corresponding stator tooth corresponds to the middle for the sensor. In another embodiment, the expected middle may be determined by using rotor alignment timestamps, by way of example. For instance, referring to FIG. 3B, values in the third row may indicate a time at which a rotor tooth is centered on sensor 2 (e.g., sensor 102) and the fifth row may indicate a time at which the same rotor tooth is centered on sensor 3. In one embodiment, it may be assumed that the radial distance from the middle position on sensor 2 to the middle position on sensor 3 may be approximately $\pi/12$ radians (e.g., for an electric motor with 24 stator teeth). And at the assumed radial speed of $\pi/24$ radians per unit time, $t_i$, it may be determined that at two units of time, $2t_i$, the rotor tooth may be expected to have traveled from the middle of sensor 2 to the middle of sensor 3. Thus, in this example, at time $2t_i$, the expected middle, $M_E$, may be expected to be $\pi/12$ radians. This value may be compared with the determined middle, $M_D$, to yield an offset, $M_E - M_D$, which may be added or subtracted to subsequent position determinations as a rotor alignment correction. This alignment correction may be used by a controller, such as control 24, in order to determine timing of current pulses to coil windings. For instance, in one case the determined offset may be added to or subtracted from a current pulse timing determination (e.g., corresponding to a time at which to provide a current pulse to a given stator tooth).

In any case, the offset may be used, such as at block 835, to determine a detection area offset, which refers to variation of areas over which sensors (or sensorless sensing mechanisms, as may be the case) may be able to sense or detect rotor teeth. Thus, to take the example of a sensor, such as sensor 100, for which a middle and an offset have been determined, it may be possible to use the determined middle of the sensor with the timestamps corresponding to sensor ON and OFF to yield a detection area "width." In one embodiment, the determined area width may be compared with an expected area of detection (e.g., based on a standard detection area), to yield an offset that may also be taken into account in determining when to provide current pulses, as is discussed further below.

Returning to method 400 of FIG. 4, at block 435, a processing offset may be determined (as indicated by E). FIG. 9 illustrates one implementation of a method embodiment 900 for determining a processing offset. Of course, in order to determine rotor alignment, speed, and offsets, time may be taken to process readings, such as timestamps, such as by a processing element of control 24. Compensating for processing time and/or delays may be done in a number of possible ways. By way of non-limiting example, method 900 illustrates a method comprising recordation of a timestamp corresponding to a start of processing, as shown at block 905. Once processing is completed (e.g., as shown by decision block 910), a subsequent timestamp may be recorded, as shown at block 915. A difference between the timestamps may be used to determine a processing offset, as shown at block 920.

Figure 10:
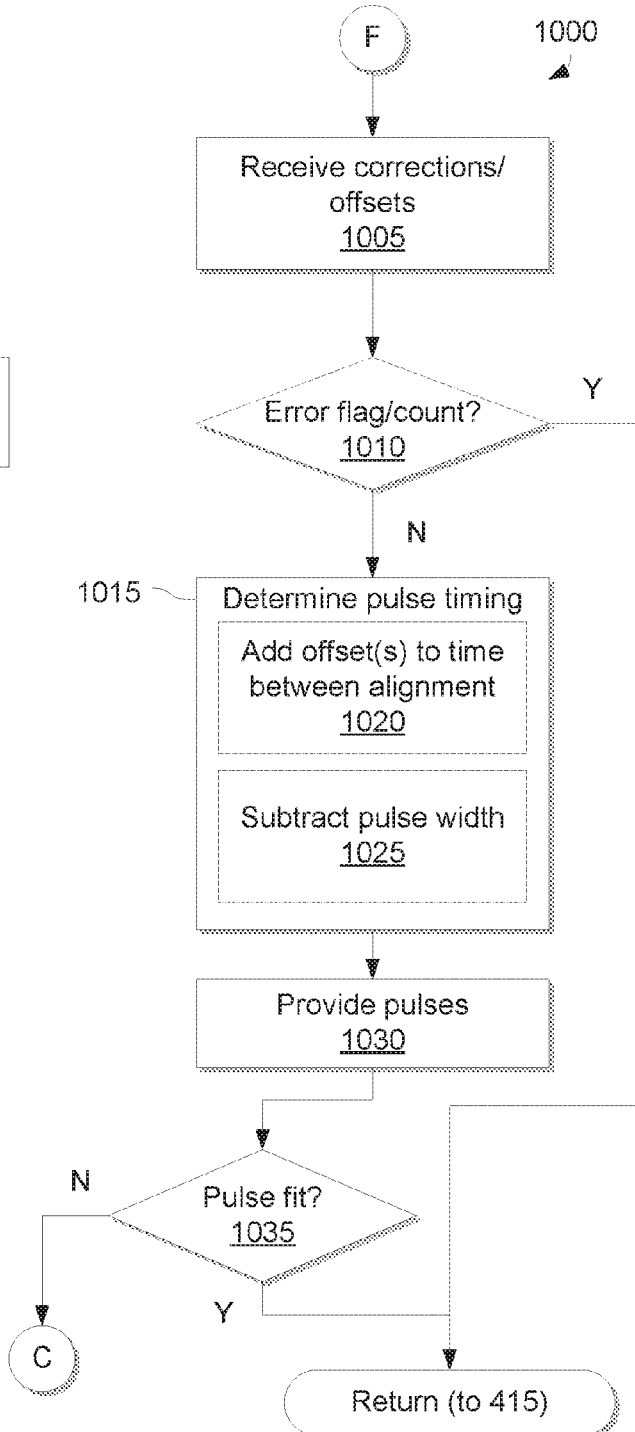
FIG. 10 is a flow diagram of a method embodiment for providing current pulses to coil windings of an electric motor.

Returning to method 400 of FIG. 4, at block 440, one or more pulses may be provided to coil windings taking into account the determined speed (e.g., timing), rotor alignment, rotor alignment offset, detection area offset, and/or processing offset (as indicated by F). Method 1000 of FIG. 10 illustrates an approach for determining pulse timing. At block 1005, corrections and offset values may be received in addition to rotor alignment and speed determinations. As discussed above, it may be desirable to abstain from providing current pulses to coil windings at times at which position and/or speed determinations may be potentially incorrect. In some cases, potentially as a failsafe, it may be desirable to check again prior to providing current pulses whether an error flag is raised or an error count is non-zero, such as is shown at block 1010 (optional). At block 1015, a determination may be made as to a mode of operation, such as, for example, to determine whether there is enough time between tooth alignment to determine offsets, etc. At block 1020 a determination may be made as to which stator teeth to activate (e.g., to which stator teeth coil windings to transmit one or more current pulses), etc. Controlling pulsing to coil windings may include at least the following considerations: (1) which stator teeth to activate, (2) at what time to activate those stator teeth coil windings, and (3) a duration of stator tooth activation. These considerations are discussed hereinafter in relation to FIG. 10.

Any number of known methods of determining which stator tooth to activate may be employed. In one example, a correspondence between groups of stator teeth may be used, at least in part, to guide stator teeth coil winding activation determinations. Looking, for example, at FIGS. 2A-2C, for instance, if determined that rotor 12 is arranged and rotating substantially as shown in FIG. 2A, then at an illustrative time to, stator teeth 3 and 6 of groups of stator teeth 1-4 may be detected to be aligned as to certain rotor teeth (rotor teeth b, d, f, h, j, l, n, and p). Based at least in part on this determination of aligned teeth, it may be determined that stator teeth 2 and 5 of stator tooth group numbers 1-4 are to be activated, as illustrated in FIG. 2B, in order to continue rotation of rotor 12. Of note, FIGS. 2A-2C illustrate generated EMF having different orientation, as shown by the different 'N' and 'S' pole arrangements. For instance, in FIG. 2A, the electromagnetic field formed on stator tooth 1 of stator teeth group numbers 1-4 is shown with a N pole closest to the rotor and a S pole on the furthest end of stator tooth 1. This electromagnetic field is of a different orientation than the electromagnetic field formed on stator tooth 4 of stator tooth groups 1-4. As the electric motor proceeds through method 400, it may be subsequently determined that stator teeth 3 and 6 of stator tooth group numbers 1-4 are to be activated, as shown in FIG. 2C. Subsequently, stator teeth 1 and 4 of stator tooth groups 1-4 may be activated, but in a different electromagnetic field orientation than that shown in FIG. 2A. Of course, this is merely an example and is not intended to be taken in a limiting sense.

It is noted that in some cases, as rotational speed of rotor 12 increases, a time between stator and rotor tooth alignment may decrease, and performing the various determinations discussed above (e.g., speed, rotor alignment, error-detection and handling, etc.), and driving current through a coil winding in a limited window of available time may be challenging. Taking, for example, the rotor and stator embodiment and particular rotational position shown in FIG. 2A, it is noted that when rotor and stator teeth are aligned, neighboring stator teeth may be arranged at a point between a full stator tooth arc (e.g., rotational distance traveled by a rotor between alignment of a given rotor tooth with a stator tooth at an initial alignment and the rotor tooth and an adjacent stator tooth at a subsequent alignment). In one embodiment, the stator teeth surrounding an aligned stator tooth may be arranged approximately half-way between a stator tooth arc (e.g., a half arc). If rotor 12 is rotating slowly enough, a period of time to rotate through the half arc may be sufficient to make necessary determinations and activate a desired stator tooth (e.g., ramp up a pulse through a coil winding to a desired amplitude). For example, at the rotor alignment illustrated in FIG. 2A, if rotor 12 is rotating slowly enough for processing and stator tooth activation to be performed in the half arc, approximated by $d_1$, activating stator teeth 1 and 4 of stator teeth groups 1-4 may provide a torque such that rotor 12 rotates in a clockwise direction. However, if rotor 12 is rotating quickly enough, processing and stator tooth activation of stator tooth 1 of stator tooth group 4 may not occur until after rotor tooth a is aligned with or passes stator tooth 1 (e.g., rotor alignment illustrated in FIGS. 2B and 2C). If stator tooth 1 of group 4 is activated after rotor tooth a is already aligned (or has already passed), then the provided torque may cause binding or rotation in an opposite direction (e.g., counter clockwise) than what may be intended (or may attract a different rotor tooth). As such, in at least some cases, if rotor 12 is rotating too quickly, activating a stator tooth that would cause application of force in one direction in a slow mode of rotation may instead cause a force to be applied in an opposite direction. For example, in a fast mode of operation a pulse to stator tooth 1 in FIG. 2A may cause rotation in a counter clockwise direction. Thus, an activated stator tooth for providing a clockwise pulse in a slow mode of operation may provide a counter clockwise pulse in a fast mode of operation, and a stator tooth for providing a counter clockwise pulse in the slow mode of operation may provide a clockwise pulse in the fast mode of operation. For simplicity, this may be referred to as inverting stator tooth activation logic. By so doing, a full stator tooth arc may be provided for processing and stator tooth activation. Of course, as may be appreciated by those of skill in the art, this may be extended to additional modes of operation where additional arc distances are needed for processing and stator teeth activation (e.g., activating aligned stator teeth, etc.)

Therefore, block 1015 of FIG. 10 may include a subroutine for determining whether the motor is operating at speeds exceeding a threshold (e.g., based at least in part on a time for a rotor to rotate a full arc between adjacent stator teeth). An example device may be capable of determining pulse timing based, at least in part, on a rotational speed threshold determination.

For example, in one embodiment, a time to make an arc (e.g., a time for a rotor tooth to travel from an aligned position with a first stator tooth to an aligned position with a second stator tooth) may be used, at least in part, to determine whether a rotational speed threshold has been met. Based, at least in part, on whether the arc time for a rotor is less than or greater than a rotational speed threshold, a determination may be made, such as at block 1015, as to whether to use a slow rotation or fast rotation process.

In a slow rotation embodiment, such as cases in which a time for a rotor to rotate a half arc is sufficient to make the above determinations, for example, at method block 1015, pulse timing may be determined for stator teeth arranged at half arc positions between rotor teeth, such as described above in relation to FIGS. 2A-2C. Once pulse timing is determined, one or more current pulses may be transmitted to these half arc stator teeth. However, if it is determined that a rotational speed threshold has been exceeded, then a fast rotation embodiment may be used, such as at block 1015, and stator tooth activation logic may be inverted (e.g., activating a stator tooth that would provide a clockwise pulse in a slow mode of operation to provide a counter clockwise pulse in a fast mode of operation, etc.). As discussed above, a determination of which stator tooth to activate may be based, at least in part, on a determination of an arc length necessary for processing and pulse activation.

In addition to identifying a desired mode of operation (e.g., slow or fast), subsequent considerations of pulse timing and pulse width, such as mentioned above, may also be addressed. For example, in one implementation, pulse timing may be determined, such as at block 1015. At times, pulse timing may be based, at least in part, on a type of load coupled to an electric motor. For example, it may be desirable for an electric motor to be capable of powering both constant and variable torque devices. This may be done by configuring an electric motor to provide both a constant power mode and a variable power mode, for example. While a constant power mode of operation may be desirable in some cases, at times, such as when an electric motor is coupled to a constant torque device (e.g., some dynamometers, like an eddy current brake unit), it may be desirable to vary an electric motor power output, such as to avoid RPM variation at the device.

Blocks 1022 and 1024 of block 1020 illustrate two illustrative possible approaches for determining pulse timing and pulse width in one example electric motor implementation. Block 1022 may correspond to a constant power approach that may use constant width current pulses determined, by way of non-limiting example, based at least partly on desired motor power output. As noted, pulse widths may be approximately constant in this example, and thus the remaining determinations may include use of a constant pulse width along with any offsets to determine a time at which to transmit one or more current pulses to activate a desired stator tooth.

In one embodiment, therefore, block 1022 may comprise adding offsets to a pulse time and subtracting the resulting value from an amount of time remaining to complete a half arc (or other arc value before tooth alignment as may be the case, referred to as a time to tooth alignment). Using, at least in part, a determined time at which to start a current pulse, one or more current pulses may be transmitted, such as via driver 22 of FIG. 1, to activate a stator tooth. One example relation for determining a pulse start time may be represented as, $t_{pstart}=t_{arc}-(t_{pulse}+(t_{ao}+t_{po}+t_{ado}))$, where $t_{pstart}$ refers to a pulse start time or pulse delay, $t_{arc}$ refers to a time until tooth alignment, $t_{pulse}$ refers to a pulse width, $t_{ao}$ refers to a rotor alignment offset, $t_{po}$ refers to a processing offset, and t refers to an area of detection offset. The $t_{pstart}$ value may be used, at least in part, to enable stator tooth activation of stator teeth arranged at half arc positions (e.g., between stator teeth), such as via driver 22 of FIG. 1.

However, if an electric motor is coupled to a constant torque device (e.g., an eddy current brake dynamometer) a method block 1024 may be used instead of block 1022, for example. In constant torque device examples, rather than using a pulse having a constant width (and constant torque output), a pulse width may be scaled to fit into available time before tooth alignment. In some cases, this may allow constant torque devices to operate without significant changes in rotation per unit time (e.g., RPM). By way of example, a scaled pulse width may be determined using a relation similar to the following: $t_{pulse}=t_{arc}-(t_{ao}+t_{po}+t_{ado})$. In this example, the resulting pulse with a width $t_{pulse}$ may be transmitted after the determinations have been made. While this approach may be advantageous for ease of determination, in some cases, the $t_{pulse}$ value may be scaled (e.g., $t_{pulse} \times 2/3$, etc.). The resulting value may then be used, such as in conjunction with the relation discussed in conjunction with block 1022 to determine a $t_{pstart}$, for example. Of course, these are but examples and are intended to merely provide certain illustrative example embodiments and are not to be taken in a limiting sense. Of course, such operation is not limited to constant torque devices. Indeed, the ability to scale pulse width may be desirable for potentially allowing an electric motor to operate with a programmable torque curve. For example, it may be possible to determine a torque width to provide a torque corresponding to desired point on a torque curve of a device (e.g., corresponding to a point of intersection between torque curves of electric motors and devices). By way of non-limiting example, torque curves with positive or negative slopes may be determined and/or torque curves may be determined having non-linear slopes, such as to operate as desired with a given device.

At a block 1030, the resulting pulse and/or timing values from block 1020 may be used, at least in part, to transmit one or more current pulses to stator teeth. In one embodiment, a controller, such as control 24 of FIG. 1, may operate in conjunction with a driver, such as driver 22. At times, a failsafe routine may be executed, such as shown by block 1035, to confirm that the determined pulse width will fit into the time remaining before tooth alignment. For example, in a case in which a pulse does not fit, then some form of error handling routine may be used, such as discussed above in relation to FIG. 7. Otherwise, pulses may be transmitted and stator teeth activated based on the offsets, pulse width, and pulse start values determined.

As discussed above, it may be desirable reduce complexity of processes to be performed at a processing element, such as at control 24. In one implementation, processing complexity and/or resources may be reduced by avoiding processing intensive mathematical operations, such as multiplication and/or division, by way of non-limiting example. In one case, this may be accomplished by restricting mathematical operations to powers of two (e.g., such as multiplying or dividing by 2), which may be accomplished by using a bitwise rotate (e.g., shifting), which may be comparatively fast. For example, such an approach may render it possible to avoid multiplication math on multiple variables. In such cases, using sums of powers of two series may speed up mathematics by approximately a dozen times as contrasted with using full multipliers. To illustrate, the following simple example is provided.

$$f(x) = \frac{x}{3} \tag{1}$$

$$f(x) = x*0.333333333333 \tag{2}$$

$$f(x)=((x)+(x>>2)+(x>>4)+(x>>6)+(x>>8)+2)>>2 \tag{3}$$

For purposes of computation, the three relations in expressions 1-3 may be approximately equivalent. However, by expressing the relation as a sum of arithmetic shifts, right shifts in the case of the example in expression 3, a processing component may be capable of arriving at an answer using significantly fewer processing resources and/or less time than attempting to solve expressions 1 or 2 directly. Using such an approach, such as when performing method 400, may serve to significantly reduce processing time and complexity.

In the foregoing discussion, different corrections and offsets are discussed for individual sensors, such as alignment offsets, by way of example. One offset that may be also added to a process of activating stator teeth, such as method 400, may include a global offset or a collective sensor offset. For instance, in some cases, sensors may be collectively offset as compared to stator teeth. In practice, a global sensor offset may tend to be less harmful to electric motor operation than an individual sensor offset or an error. Nevertheless, it may be possible to adjust for a global offset in a calibration routine, for example, which may be performed at fabrication or on start-up, for example. In one embodiment, calibration may include using coils to align teeth (e.g., generating and maintaining an EMF long enough for stator and coil teeth to completely align) and then causing the motor to rotate in an opposite direction to measure sensor offset to a position corresponding to a position at which a rotor tooth is aligned with corresponding stator teeth. Because sensorless sensing mechanism embodiments do not use independent sensing mechanisms, there may be no global offset.

Operation described above may, in some cases, be performed using control circuitry, such as controller 24 and/or driver 22 in FIG. 1. While such control circuitry may be formed on separate devices, in some cases it may be desirable to form one or more controllers and/or drivers (e.g., controllers 24 and/or drivers 22) on a single device. For example, multiple drivers 22 may be formed in a single device using any one of several suitable CMOS processing technologies, for example. In other implementations, multiple drivers may be formed along with a processor (e.g., digital controller or microprocessor core) on a single device (e.g., as a system on a chip). Such a processor may provide signals to control the opening and closing of switches for multiple drivers controlling coil windings for multiple stator teeth of a motor. In a particular implementation, a single device integrating a processor and multiple drivers may comprise a package with multiple external terminals (e.g., a ball grid array package) mountable to a printed circuit board. For example, the external terminals of the package may be coupled to charge storage devices (e.g., capacitors), one or more windings of respective stator teeth and a power supply 26 that are integrated with a motor. Of course, other embodiments are contemplated by the present description, such as, for example, drivers capable of coupling to a plurality of coil winding sets. The coil winding sets may be electrically coupled in series or parallel, such as to accommodate larger and/or fewer drivers, etc., such as according to design constraints.

Figure 11:
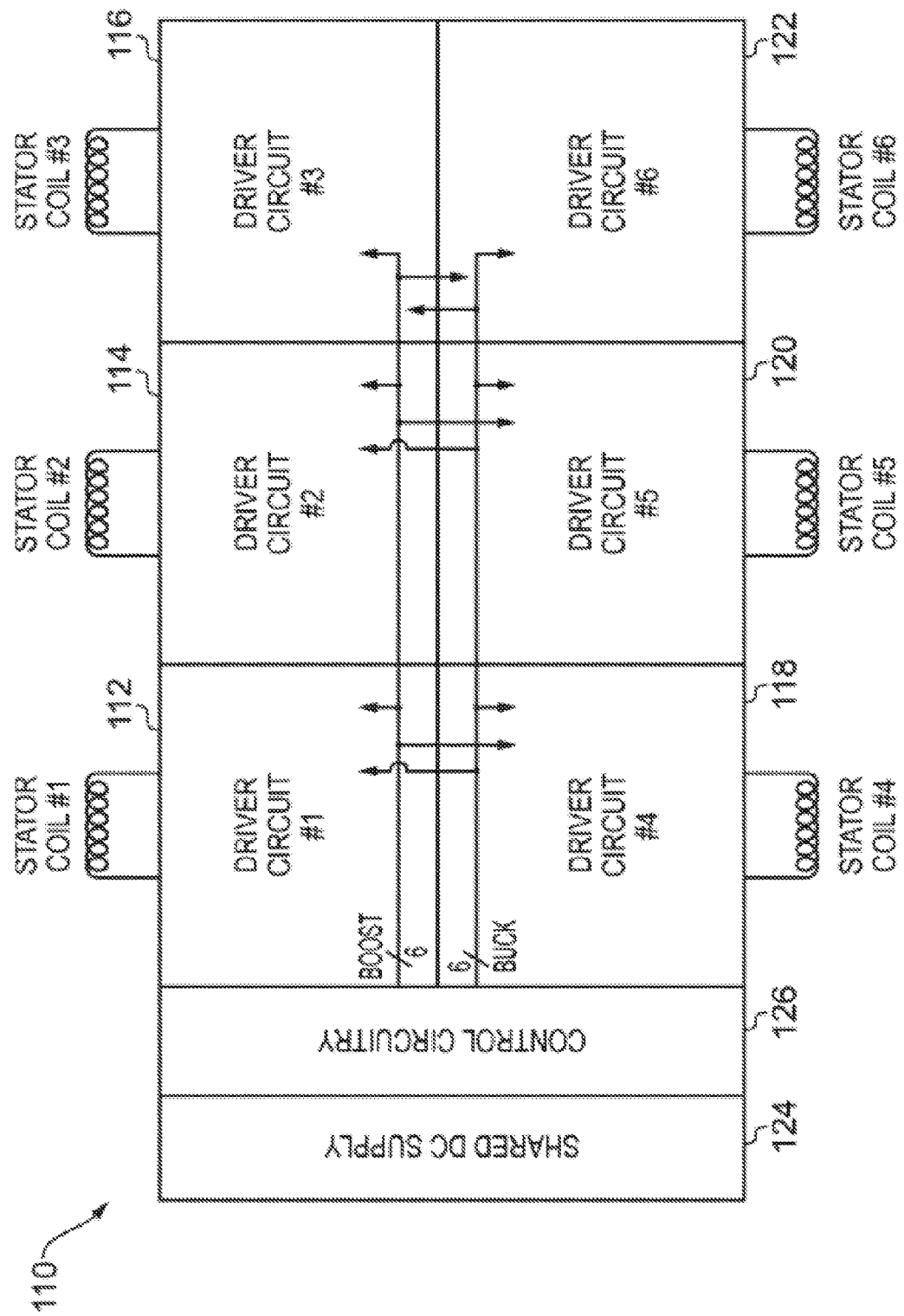
FIG. 11 is a schematic illustration of a driver board according to one embodiment.

FIG. 11 schematically illustrates a driver board in one example embodiment comprising multiple drivers 22 on a single driver board 110. Driver board 110 is provided as a single integrated circuit board on which six driver circuits 112, 114, 116, 118, 120 and 122, control circuitry 126 and shared DC supply 124 are arranged. The control circuitry may provide current pulses for stator coils (e.g., boost and buck signals) individually to each of the driver circuits.

Figure 12:
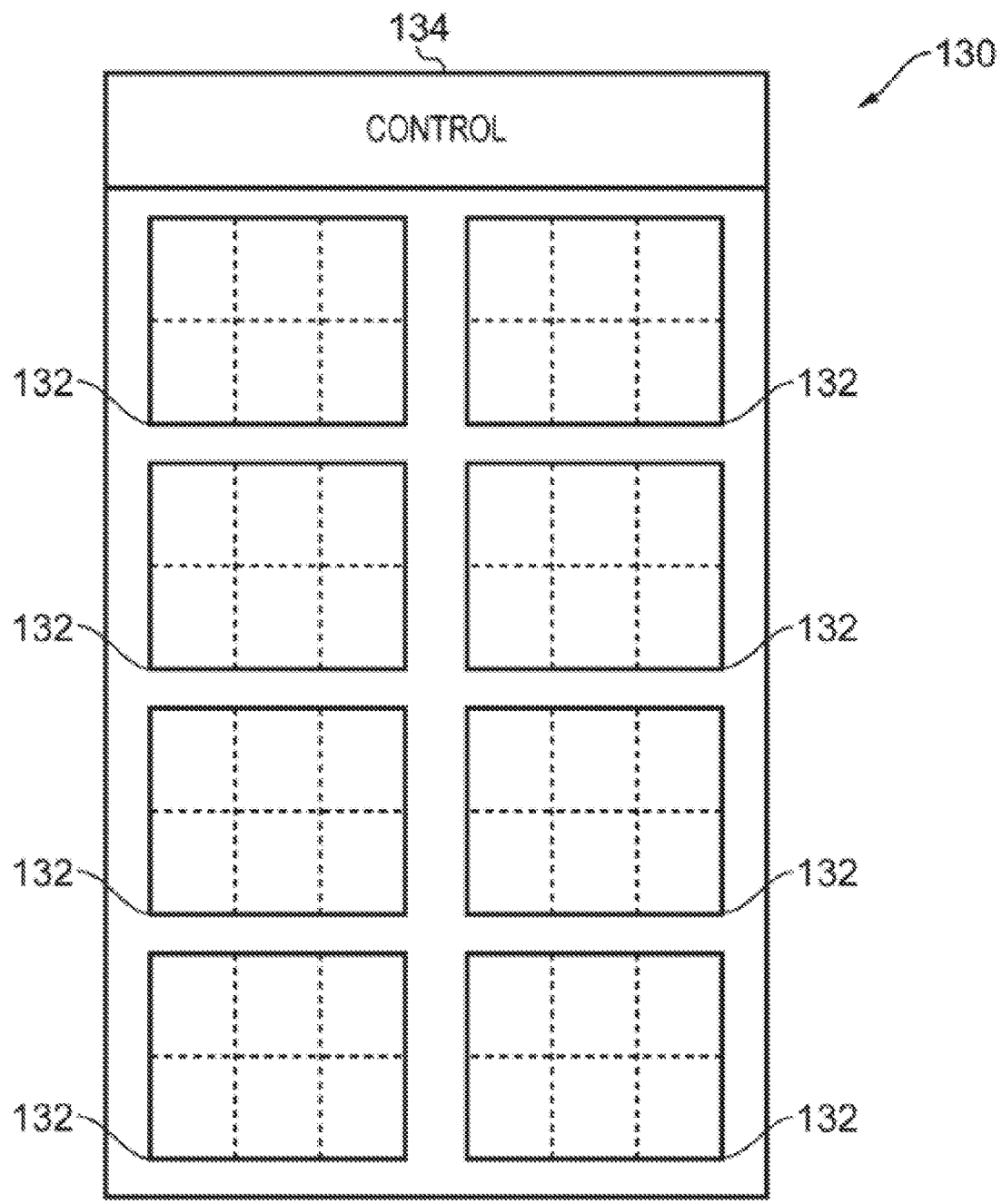
FIG. 12 is a schematic illustration of an electric motor driver apparatus comprising eight driver boards, such as is shown in FIG. 11 in one embodiment.

FIG. 12 schematically illustrates an example switched reluctance electrical motor driver apparatus 130 in one example embodiment which comprises eight driver boards 132 (for example configured as shown by FIG. 11) and may thus be configured to control 48 individual stator teeth. An overall control unit 134 may also form part of the apparatus 130 and may dictate high-level operation of the eight driver boards 132. By way of non-limiting example, control unit 134 may be capable of causing individual driver boards to be temporarily switched off when a corresponding electrical motor should operate in a lower power mode and when each individual driver board is coupled to a set of stator coils (for example a quadrant in each stator section) which can be switched off to effect this low power mode. It is noted however that the combination of driver circuit control provided by control unit 134 and board controls 126 may be advantageous for a number of reasons. For instance, such an arrangement may allow any individual driver circuit to be switched on or off regardless of the operation of other driver circuits. Also, control over any one stator coil provided by a corresponding driver circuit may be fully independent of control over any other stator coil provided by any other driver circuit. Electrical motor driver apparatus 130 may thus be capable of providing individual control over up to 48 driver circuits and stator coils. In some cases, it may be chosen to closely link the operation of some driver circuits, such as to reduce phases of electric power to drive a rotor, etc. For instance, in one embodiment, by linking operation of multiple driver circuits, it may be possible to use the same phases of electrical power provided to various stator coils.

In the context of the present disclosure, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other electrical conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a wireless connection between a components of device or system (e.g., a wireless connection between a processing component of a vehicle and one or more components of an electric motor, a wireless connection between a client and a server over a network, etc.), which generally refers to the ability for the components to transmit, receive, and/or exchange communications.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to cooperate, liaise, and/or interact, such as, for example, by being "optically coupled." Likewise, the term "coupled" may be understood to mean indirectly connected in an appropriate context. It is further noted, in the context of the present disclosure, the term physical if used in relation to memory, such as memory components or memory states, as examples, necessarily implies that memory, such memory components and/or memory states, continuing with the example, is tangible.

Additionally, in the present disclosure, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance (e.g., an intermediary substance formed during an intervening process operation), between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second," "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements or identical results, unless otherwise expressly indicated.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

The term electronic file and/or the term electronic document used in this document refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

Figure 13:
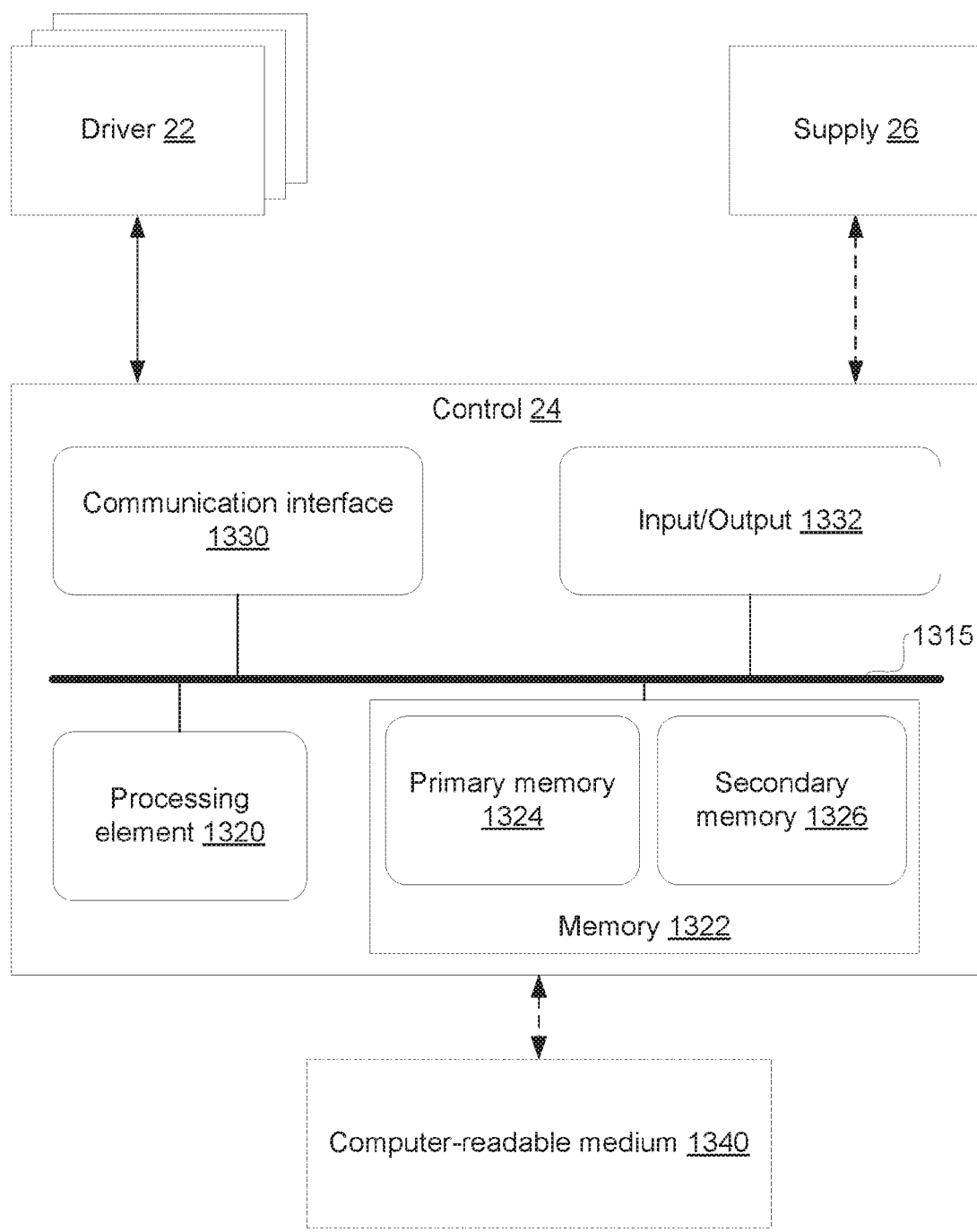
FIG. 13 is a schematic illustration of electric motor components according to one embodiment.

In one example embodiment, as shown in FIG. 13, an electric motor embodiment may comprise components such as control 24, electrically coupled to a supply 26, and one or more drivers 22, such as was discussed in relation to FIG. 1, and/or a computer-readable medium 1040. In one embodiment, such as that illustrated by FIGS. 11 and 12, multiple drivers 22 may be included on a single board, and multiple driver boards may be electrically coupled to control 24. For instance, in one example case, supply 26 may comprise a battery (or other charge storage device), and signal pulses may be transmitted from supply 26, such as via one or more drivers 22, to one or more coil windings of an electric motor. Supply 26 may optionally be electrically coupled to control 24. In another embodiment, such as shown in FIG. 11, the supply for an electric motor may be electrically coupled to the drivers, such as is shown by shared DC supply 124 of FIG. 11.

Control 24 in FIG. 13 may comprise features, for example, of a computing device, in an embodiment. It is further noted that the term computing device, in general, refers at least to a processor and a memory connected by a communication bus. Likewise, in the context of the present disclosure at least, this is understood to refer to sufficient structure within the meaning of 35 USC §112(f) so that it is specifically intended that 35 USC §112(f) not be implicated by use of the term "computing device" and/or similar terms; however, if it is determined, for some reason not immediately apparent, that the foregoing understanding cannot stand and that 35 USC §112(f) therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 4-10 and corresponding text (e.g., paragraphs [0017]-[0037] in the as-filed version of this document) of the present disclosure.

Referring now to FIG. 13, in an embodiment, processor (e.g., processing element) 1320 and memory 1322, which may comprise primary memory 1324 and secondary memory 1326, may communicate by way of a communication bus 1315, for example. The term "computing device," in the context of the present disclosure, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present disclosure, may comprise hardware, software, firmware, or any combination thereof (other than software per se).

Unless specifically stated otherwise, a process as described, such as with reference to flow diagrams and/or otherwise, may also be executed and/or affected, in whole or in part, by control 24, such as operating as a computing device. A control, such as control 24, may vary in terms of capabilities and/or features. Claimed subject matter is intended to cover a wide range of potential variations.

A computing device, such as control 24, may include and/or may execute a variety of now known and/or to be developed operating systems, derivatives and/or versions thereof, including computer operating systems, such as Windows, OS X, Linux, a mobile operating system, such as iOS, Android, Windows Mobile, and/or the like. A computing device, such as control 24, may include and/or may execute a variety of possible applications, such as a client software application enabling communication with other devices. For example, one or more electronic signals comprising messages (e.g., content) may be communicated, such as via one or more protocols, now known and/or later to be developed, may be used to transmit electric motor-related characteristics, such as rotor position, speed, offsets, etc. between multiple electric motors of a device, and/or between an electric motor and a central control component of a device (e.g., a principle controller or processing component of a vehicle). A computing device, such as control 24, may also include executable computer instructions to process and/or communicate digital content, such as, for example, textual content, digital multimedia content, and/or the like. A computing device, such as control 24, may also include executable computer instructions to perform a variety of possible tasks, such as determining rotor position, determining rotor speed, error checking and/or handling, determining corrections or offsets, determining current pulse timing, facilitating pulse transmission to coil windings, such as via a driver, etc. The foregoing is provided merely to illustrate that claimed subject matter is intended to include a wide range of possible features and/or capabilities.

In FIG. 13, control 24 may provide one or more sources of executable computer instructions in the form physical states and/or signals (e.g., stored in memory states), for example. Control 24 may communicate with one or more drivers 22 by way of an electrical coupling, for example. As previously mentioned, the electrical coupling, while physical, may not necessarily be tangible. Although control 24 of FIG. 13 shows various tangible, physical components, claimed subject matter is not limited to computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1322 may comprise any non-transitory storage mechanism. Memory 1322 may comprise, for example, primary memory 1324 and secondary memory 1326, additional memory circuits, mechanisms, or combinations thereof may be used. Memory 1322 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1322 may be utilized to store a program of executable computer instructions. For example, processor 1320 may fetch executable instructions from memory and proceed to execute the fetched instructions. Memory 1322 may also comprise a memory controller for accessing device readable-medium 1340 that may carry content, which may include code, and/or instructions, for example, executable by processor 1320 and/or some other device, such as a controller, as one example, capable of executing computer instructions, for example. Under direction of processor 1320, a non-transitory memory, such as memory cells storing physical states (e.g., memory states), comprising, for example, a program of executable computer instructions, may be executed by processor 1320 and able to generate signals to be communicated via a network, for example, as previously described. Generated signals may also be stored in memory, also previously suggested.

Memory 1322 may store electronic files and/or electronic documents and may also comprise a device-readable medium that may carry and/or make accessible content, including code and/or instructions, for example, executable by processor 1320 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining," "establishing", "obtaining," "identifying," "selecting," "generating," and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 13, processor 1320 may comprise one or more circuits, such as digital circuits, to perform at least a portion of a computing procedure and/or process. By way of example, but not limitation, processor 1320 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1320 may perform signal processing, typically substantially in accordance with fetched executable computer instructions, such as to manipulate signals and/or states, to construct signals and/or states, etc., with signals and/or states generated in such a manner to be communicated and/or stored in memory, for example.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method for an electric motor comprising:
   determining a difference between a time to tooth alignment and one or more error corrections;
   determining a pulse delay or a pulse width, or a combination thereof based, at least in part, on the determined difference; and transmitting one or more signals to at least one driver of the electric motor to drive a pulse to one or more coil windings of at least one stator tooth of a stator of the electric motor based at least in part on the determined pulse delay or the determined pulse width, or the combination thereof.

2. The method of claim 1, wherein the determined pulse delay is based at least in part on a constant pulse width.

3. The method of claim 1, wherein the determined pulse delay is also based at least in part on an area of detection offset.

4. The method of claim 1, wherein the determined pulse delay is also based at least in part on a processing offset.

5. The method of claim 2, further comprising confirming that the pulse width fits within the time to tooth alignment.

6. The method of claim 1, further comprising transmitting the pulse delay to a timer of the electric motor.

7. The method of claim 1, further comprising determining whether a rotor of the electric motor is rotating in a fast or a slow mode of operation.

8. The method of claim 7, further comprising transmitting one or more current pulses according to an inverted stator tooth logic based, at least in part, on the determination that the rotor of the electric motor is rotating in a fast mode of operation.

9. The method of claim 1, further comprising determining whether a load coupled to a rotor of the electric motor comprises a constant torque device.

10. The method of claim 9, further comprising scaling pulses to fit the time to tooth alignment based, at least in part, on the determination of whether the load coupled to the rotor of the electric motor comprises a constant torque device.

11. An apparatus comprising:
a stator having a plurality of stator teeth;
at least one driver electrically coupled to one or more coil windings of at least one stator tooth of the plurality of stator teeth;
at least one controller electrically coupled to the driver, the at least one controller to:
determine a difference between a time to tooth alignment and one or more error corrections;
determine a pulse delay or a pulse width, or a combination thereof based, at least in part, on the determined difference; and
transmit one or more signals to the at least one driver to drive a pulse to the one or more coil windings of the at least one stator tooth based at least in part on the determined pulse delay or the determined pulse width, or the combination thereof.

12. The apparatus of claim 11, further comprising a rotor alignment sensing mechanism, and wherein the one or more error corrections are based, at least in part, on a rotor alignment estimation based, at least in part, on signals received from the rotor alignment sensing mechanism.

13. The apparatus of claim 12, wherein the rotor alignment sensing mechanism comprises a sensorless sensing mechanism.

14. The apparatus of claim 13, wherein the sensorless sensing mechanism measures changes in inductance.

15. The apparatus of claim 11, wherein the at least one controller is to operate in a slow operation mode or a fast operation mode based, at least in part, on a determination of a speed of rotor rotation.

16. The apparatus of claim 11, wherein the at least one controller is to scale a pulse width based at least in part on a load coupled to a rotor.

17. An article comprising: a non-transitory computer readable medium with instructions stored thereon that when executed by a processor of a controller are to:
determine a difference between a time to tooth alignment and one or more error corrections;
determine a pulse delay or a pulse width, or a combination thereof based, at least in part, on the determined difference; and
transmit one or more signals to at least one driver to drive a pulse to one or more coil windings of at least one stator tooth based at least in part on the determined pulse delay or the determined pulse width, or the combination thereof.

18. The article of claim 17, further comprising instructions that when executed by the processor of the controller are to: determine the one or more error corrections based, at least in part, on a rotor alignment estimation based, at least in part, on signals received from a rotor alignment sensing mechanism.

19. The article of claim 18, wherein the rotor alignment estimation is to be based at least in part on one or more measures of inductance.

20. The article of claim 17, further comprising instructions that when executed by the processor of the controller are to: determine whether the pulse width fits within the time to tooth alignment.

* * * * *